(12) United States Patent  
Liang

(10) Patent No.: US 9,359,249 B2
(45) Date of Patent: Jun. 7, 2016

(54) ANTI-CORROSION ANTI-REFLECTION GLASS AND RELATED METHODS

(71) Applicant: Guardian Industries Corp., Auburn Hills, MI (US)

(72) Inventor: Liang Liang, Taylor, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 154 days.

(21) Appl. No.: 13/904,421

(22) Filed: May 29, 2013

(65) Prior Publication Data

US 2014/0356633 A1    Dec. 4, 2014

(51) Int. Cl.
 *B05D 5/06* (2006.01)
 *C03C 17/30* (2006.01)
 *G02B 1/111* (2015.01)
 *C09D 5/00* (2006.01)
 *C03C 17/00* (2006.01)

(52) U.S. Cl.
 CPC .............. *C03C 17/30* (2013.01); *C03C 17/009* (2013.01); *C09D 5/006* (2013.01); *G02B 1/111* (2013.01); *C03C 2217/732* (2013.01); *C03C 2218/113* (2013.01)

(58) Field of Classification Search
 CPC ........................................................ G02B 1/11
 See application file for complete search history.

(56) References Cited

U.S. PATENT DOCUMENTS

| 4,929,278 | A * | 5/1990 | Ashley et al. ............ 106/287.12 |
| 2005/0233113 | A1 * | 10/2005 | Kotani et al. ................ 428/141 |
| 2008/0220152 | A1 * | 9/2008 | Sharma ........................... 427/74 |
| 2010/0313950 | A1 * | 12/2010 | Mukhopadhyay et al. ... 136/256 |
| 2012/0114846 | A1 | 5/2012 | Harris et al. |

FOREIGN PATENT DOCUMENTS

| CA | 2 414 666 | 1/2003 |
| EP | 0 400 796 | 12/1990 |

OTHER PUBLICATIONS

A. Paul et al., Alkaline durability of some silicate glasses containing CaO, FeO and MnO, Journal of Materials Science, 13 (1978) pp. 97-107.

C. Sinton et al., Experimental survey of the chemical durability of commercial soda-lime-silicate glasses, Materials Research Bulletin, 36 (2001) pp. 2471-2479.

(Continued)

*Primary Examiner* — Elizabeth Burkhart  
(74) *Attorney, Agent, or Firm* — Nixon & Vanderhye P.C.

(57) ABSTRACT

Certain example embodiments relate to methods of making anti-corrosion anti-reflection (ACAR) films, and/or associated coated articles. The methods may involve forming the reaction product of a hydrolysis and/or a condensation reaction of at least one hybrid alkoxide selected from the group consisting of $Si(OR)_4$—$Al(s\text{-}OBu)_3$, $Si(OR)_4$—$B(OBu)_3$ and $Si(OR)_4$ and $Zr(OBu)_4$, where R is a $CH_2CH_3$ group, s-OBu is sec-butoxide and OBu is n-butoxide. The solution optionally may be blended and/or mixed with silicon nanoparticles and/or siloxanes. A Tqe % gain of about 3.2% and/or refractive index of 1.5 or less is/are possible in certain example embodiments.

4 Claims, 12 Drawing Sheets

Hydrolysis of Zr(OBu)₄.

(56) References Cited

OTHER PUBLICATIONS

D. Hubbard et al., Effect of the solubility 1 of glass on the behavior of the glass electrode, Research Paper RP1187, Journal of Research of the National Bureau of Standards, 22 (1939) pp. 339-349.

D. L. Pavia et al., Introduction to Spectroscopy, Chapter 8, Brooks/Cole (2001) pp. 390-465.

E. Aubry et al., Poisoning prevention of TiO2 photocatalyst coatings sputtered on soda-lime glass by intercalation of $SiN_x$ diffusion barriers, Surface & Coatings Technology, 201 (2007) pp. 7706-7712.

H. Franz, Durability and corrosion of silicate glass surfaces, Journal of Non-Crystalline Solids, 42 (1980) pp. 529-534.

J. C. Pouxviel et al., NMR study of the sol/gel polymerization, Journal of Non-Crystalline Solids, 89 (1987) pp. 345-360.

J. Livage et al., Sol-gel chemistry of transition metal oxides, Prog. Solid St. Chem., 18 (1988) pp. 259-341.

J. McMurry, Organic Chemistry, Brooks/Cole (1992) 1325 pages.

J.O. Edwards et al., Structural principles of the hydrated polyborates, J. lnorg. Nucl. Chem., 15 (1960) pp. 329-337.

K. D. Keefer, The Effect Of Hydrolysis Conditions On The Structure And Growth Of Silicate Polymers, Mat. Res. Soc. Symp. Proc., 32 (1984) pp. 15-24.

K. S. Mazdiyasni et al., Preparation of Ultra-High-Purity Submicron Refractory Oxides, Journal of The American Ceramic Society, 48:7 (1965) pp. 372-375.

L. C. Klein, Sol-Gel Technology for Thin Films, Fibers, Preforms, Electronics and Specialty Shapes, Chapter 1, Noyes Publication (1988) 20 pages.

M. H. Stans, Bond dissociation energy in simple molecules, National Bureau of Standards (1970) 58 pages.

O. Kriz et al., A1 NMR Behavior of Aluminum Alkoxides, Journal of Magnetic Resonance, 60 (1984) pp. 375-381.

R. H. Doremus et al., Reaction of water with glass: influence of a transformed surface layer, Journal of Materials Science, 18 (1983) pp. 612-622.

W. A. Lanford et al., Hydration Of Soda-Lime Glass, Journal of Non-Crystalline Solids, 33 (1979) pp. 249-266.

W. F. Du et al., Study of $Al_2O_3$ effect on structural change and phase separation in $Na_2O$—$B_2O_3$—$SiO_2$ glass by NMR, Journal of Materials Science, 35 (2000) pp. 4865-4871.

W. J. Paulus et al., Bulk synthesis and selective exchange of strontium ions in $Na_4Mg_6Al_4Si_4O_{20}F_4$ mica, Nature, 357 (1992) pp. 571-573.

Y. Zhao et al., Science and Technology of Glass, Chemical Industry Press, Beijing, China (2006) pp. 16-19 and 29 [with partial English translation].

U.S. Appl. No. 13/826,011, filed Mar. 14, 2013; Liang.

\* cited by examiner

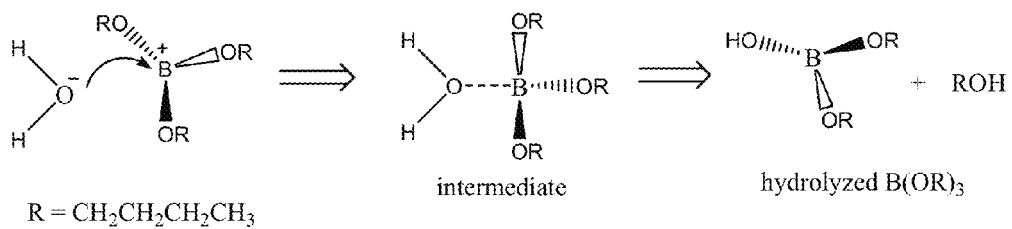
R = CH$_2$CH$_2$CH$_2$CH$_3$
Figure 1. Hydrolysis of B(OBu)$_3$.
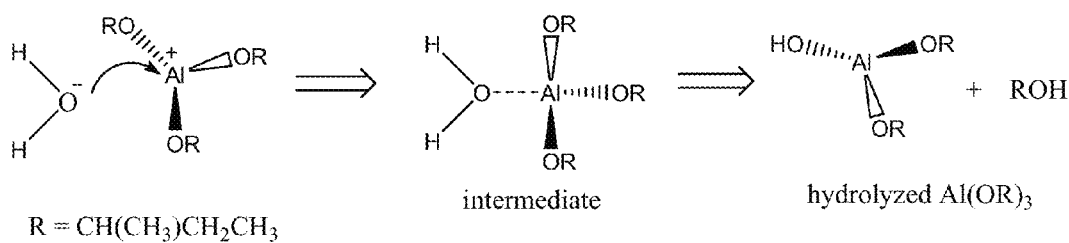
R = CH(CH$_3$)CH$_2$CH$_3$
Figure 2. Hydrolysis of Al(s-OBu)$_3$.
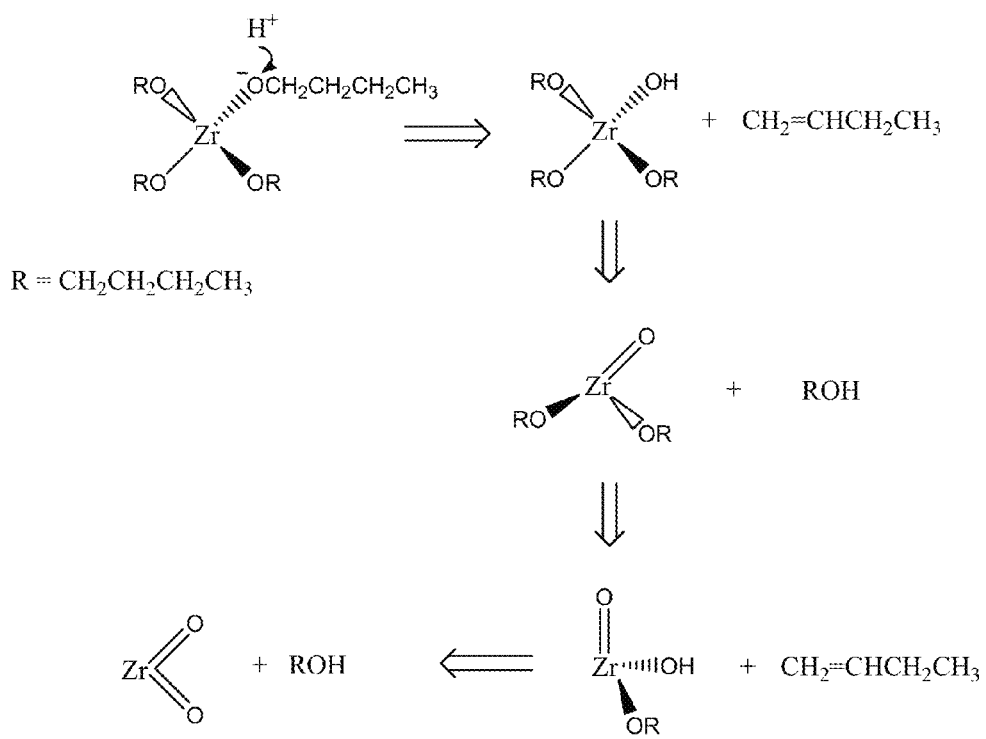
R = CH$_2$CH$_2$CH$_2$CH$_3$
Figure 3. Hydrolysis of Zr(OBu)$_4$.

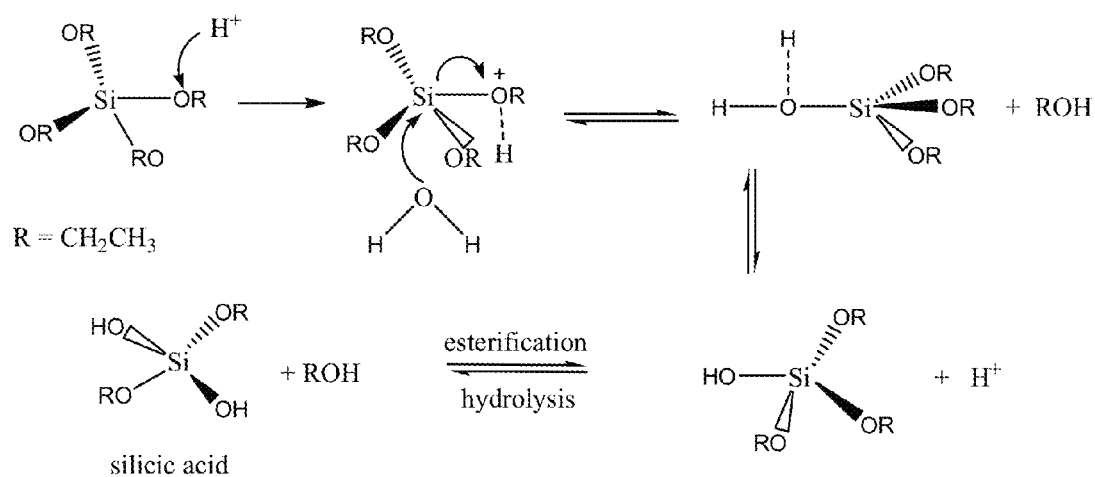
Figure 4. Hydrolysis of TEOS with acid as a catalyst.
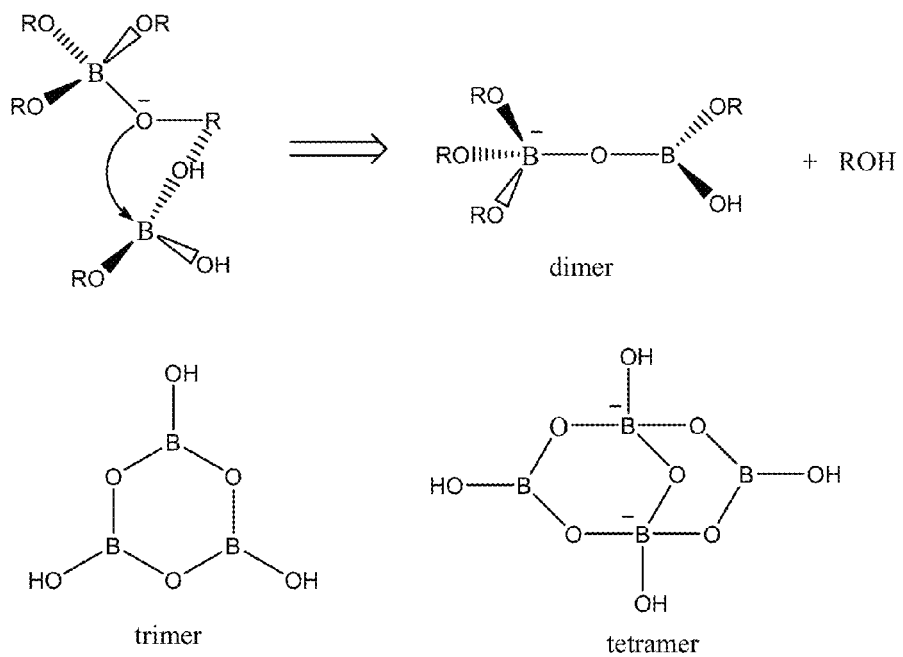
R = CH$_2$CH$_2$CH$_2$CH$_3$
Figure 5. Condensation of hydrolyzed B(OBu)$_3$.

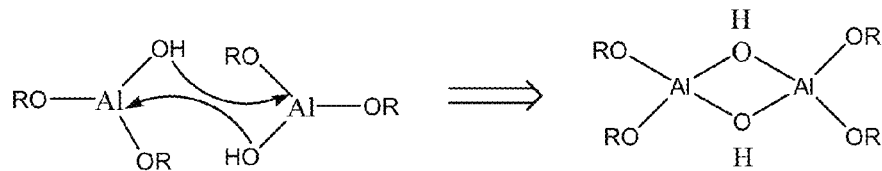
R = CH(CH)$_3$CH$_2$CH$_3$
Figure 6. Condensation of hydrolyzed Al(s-OBu)$_3$.
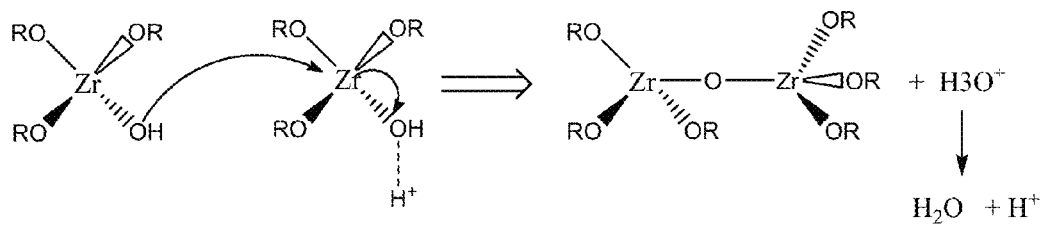
Figure 7. Condensation of hydrolyzed Zr(OBu)$_4$.
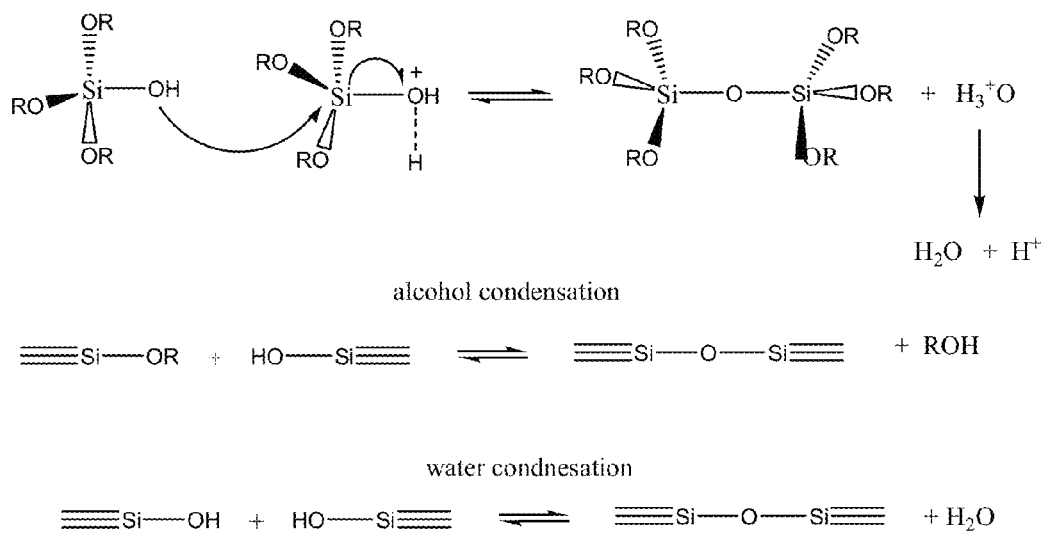
Figure 8. Condensation of hydrolyzed Si(OR)$_4$ with acid as a catalyst.

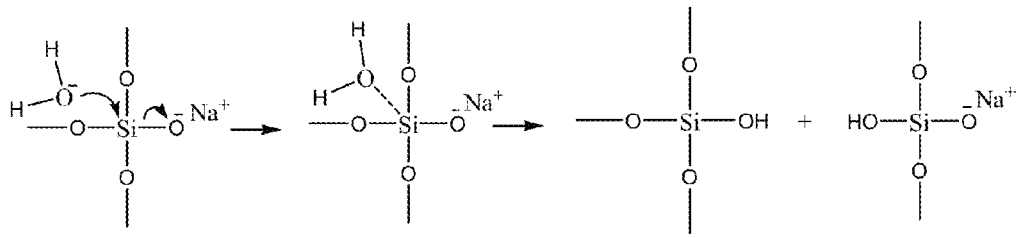
Figure 9. Hydrolysis of glass with an unsymmetrical network.
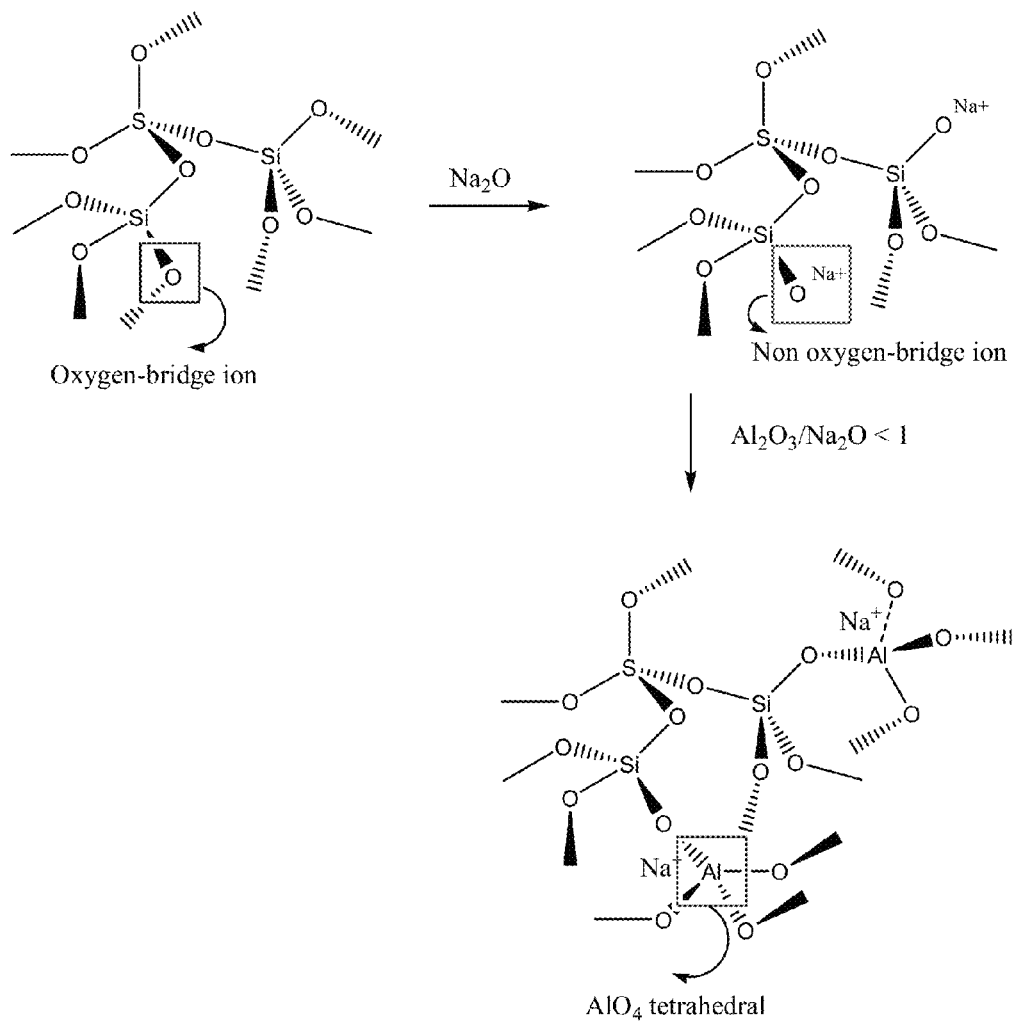
Figure 10. Durable structure of ACAR glass made by hybrid alkoxides with Si(OR)₄-Al(s-OBu)₃.

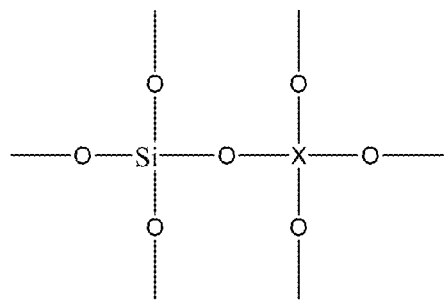
X: Al, B or Zr
Figure 11. Chemical structure from hybrid alkoxides.
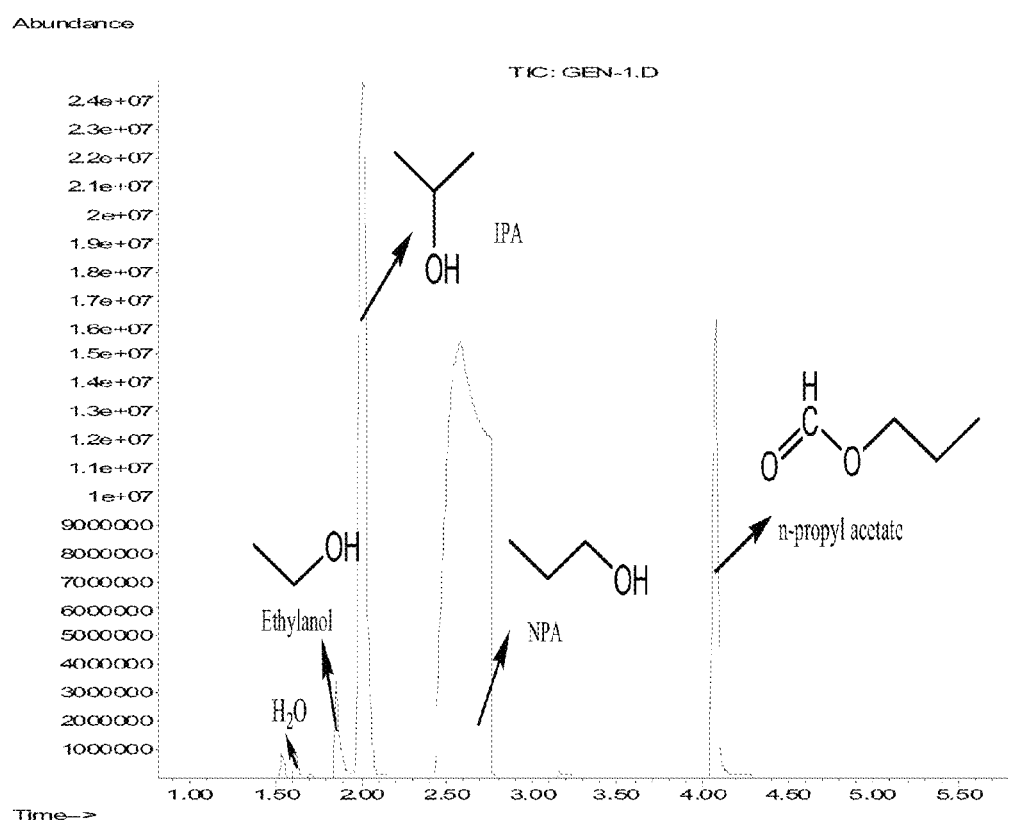
Figure 12. GC-MS spectrum of Gen 1.5 sol.

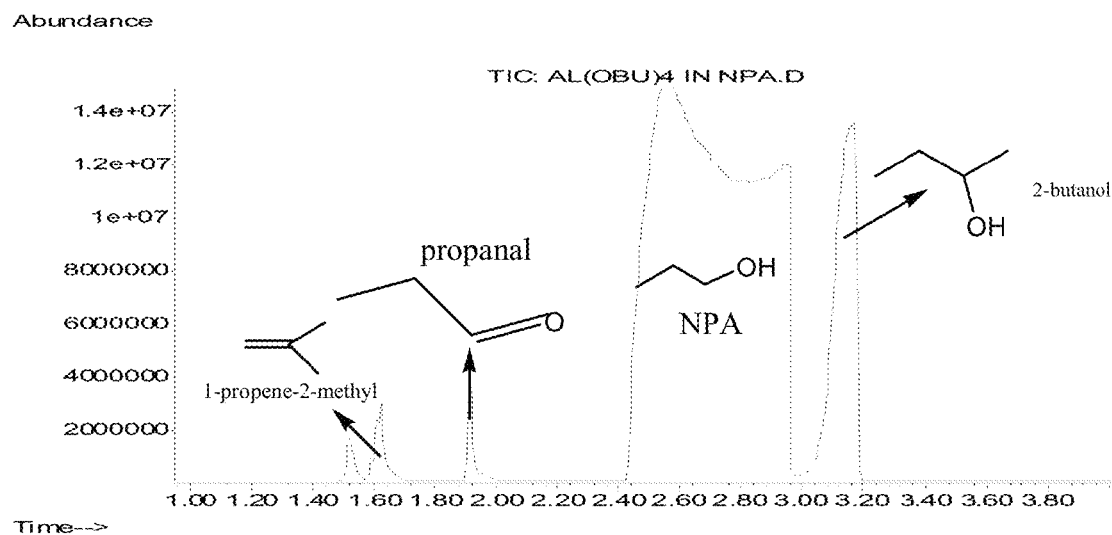
Figure 13. GC-MS spectrum of sol with Al(s-OBu)$_3$.
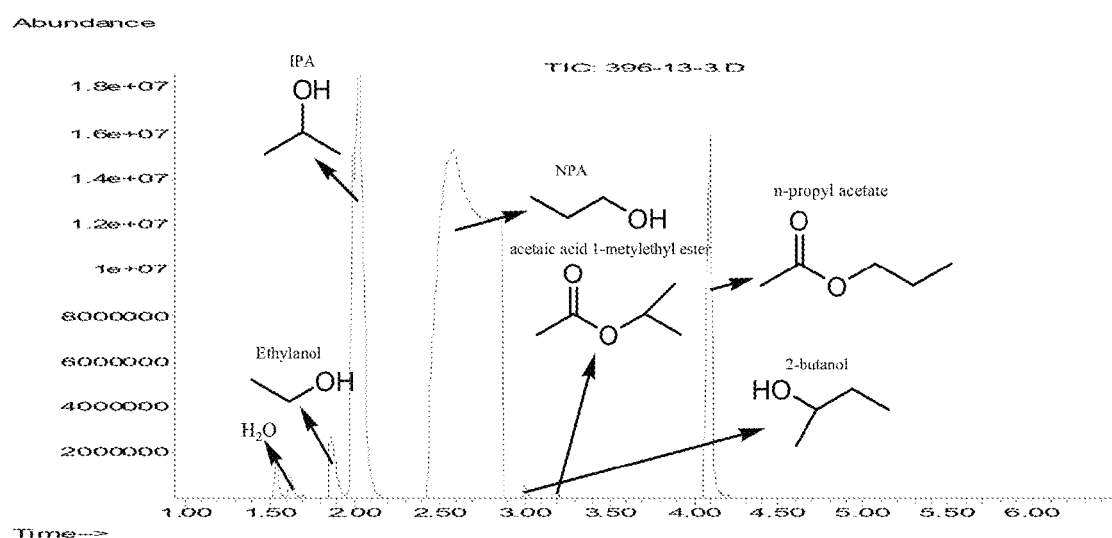
Figure 14. GC-MS spectrum of sol from hybrid alkoxides with Si(OR)$_4$-Al(s-OBu)$_3$.

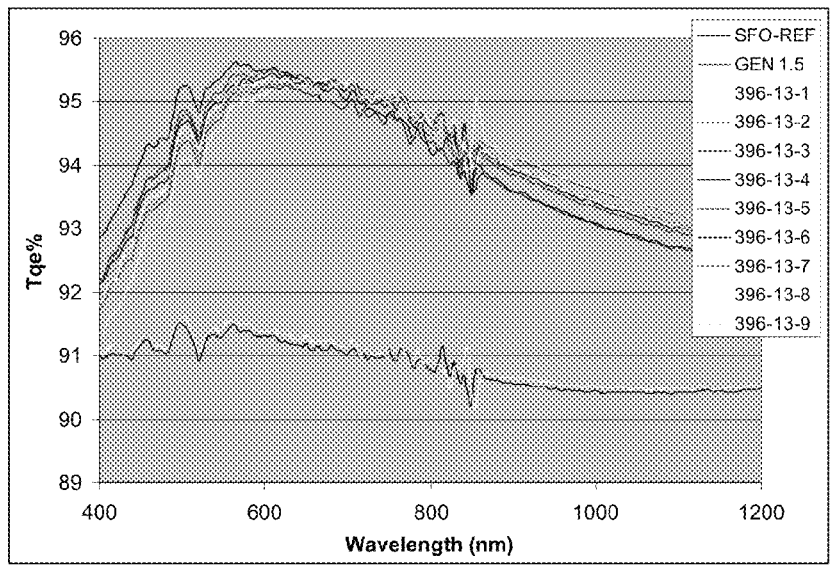
Figure 15. Transmittance curves of ACAR glass made by blend sol with different hybrid alkoxides. The labels are same as those in Table 8.
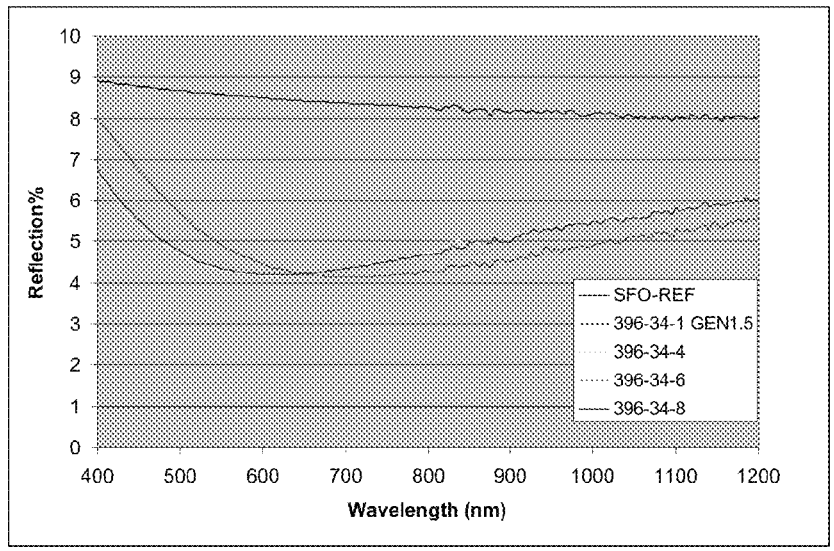
Figure 16. Reflection curves of ACAR glass. The labels are same as those in Table 9.

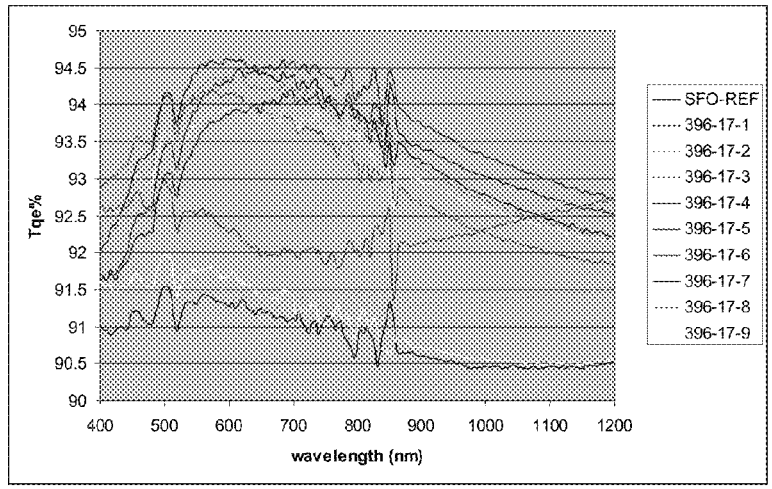
Figure 17. Transmittance curves of ACAR glass made by mixed sols. The labels are same as those in Table 10.
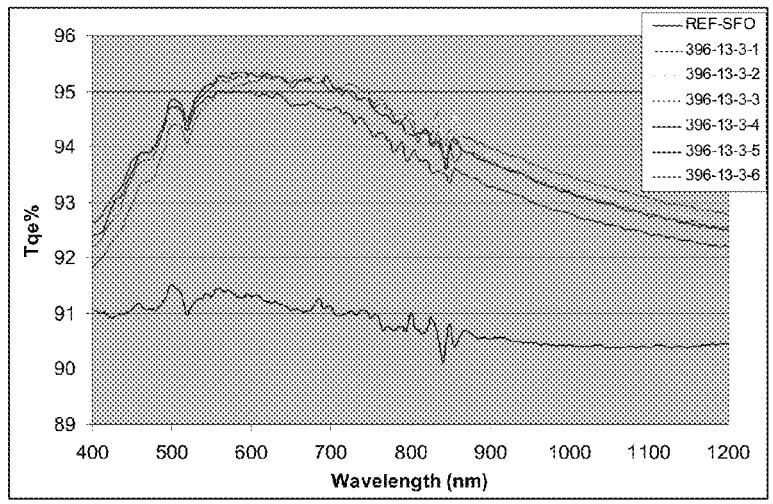
Figure 18. Transmittance curves of ACAR glass made by Al-Si hybrid alkoxides. The labels in Figure are same as those in Table 13.

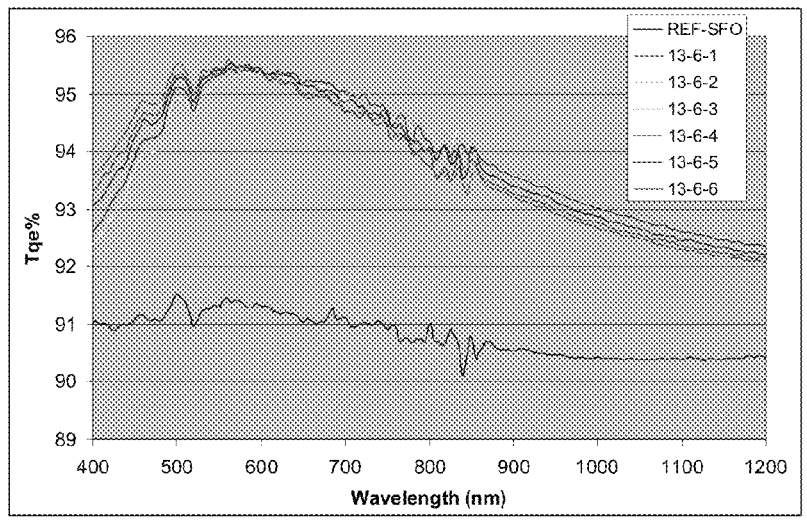
Figure 19. Transmittance curves of ACAR glass made by B-Si hybrid alkoxides. The labels in Figure are same as those in Table 13.
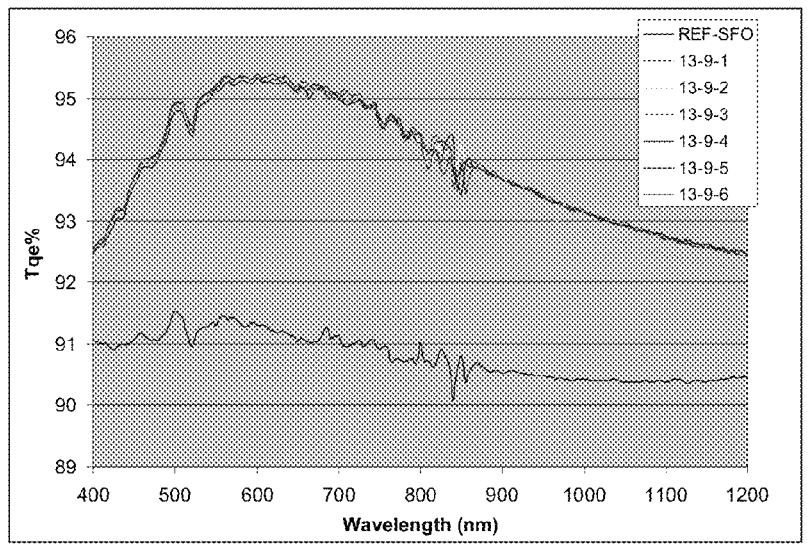
Figure 20. Transmittance curves of ACAR glass made by Zr-Si hybrid alkoxides. The labels in Figure are same as those in Table 13.

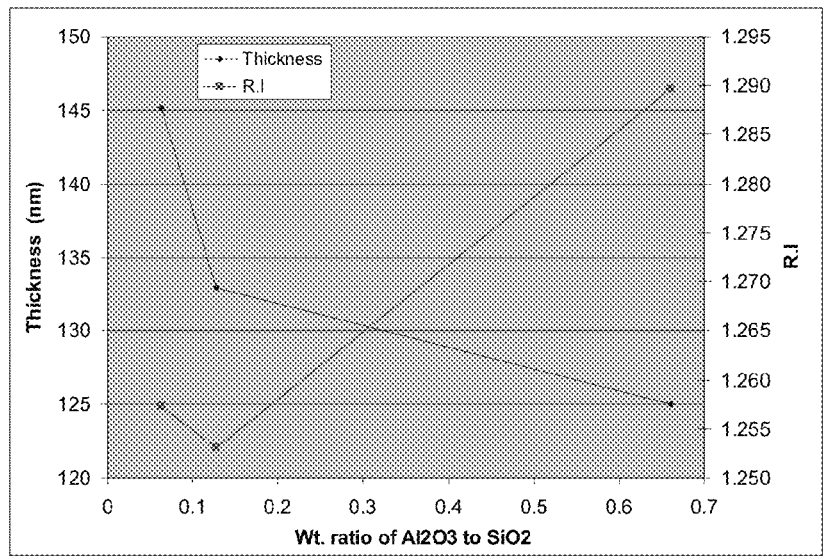
Figure 21. Thickness and refractive index of ACAR glass made by sol with silica and aluminum alkoxides. The labels in Figure are same as those in Table 17.
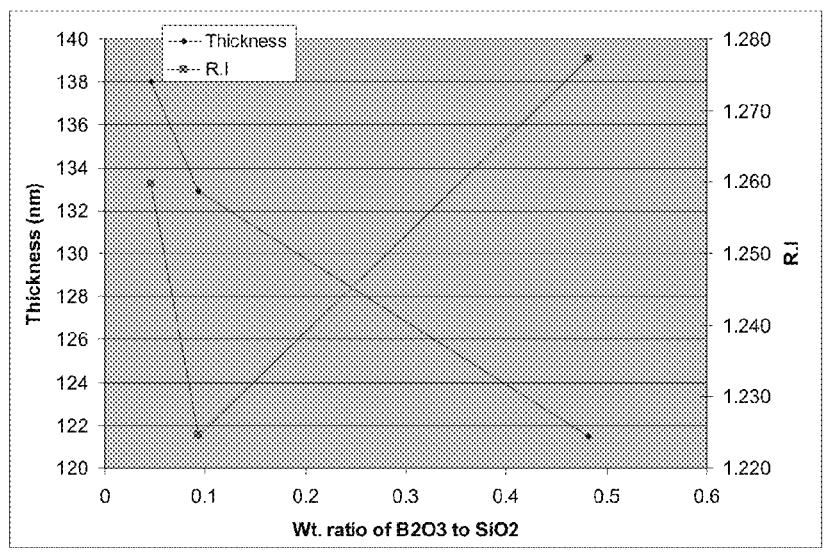
Figure 22. Thickness and refractive index of ACAR glass made by sol with silica and boron alkoxides. The labels in Figure are same as those in Table 17.

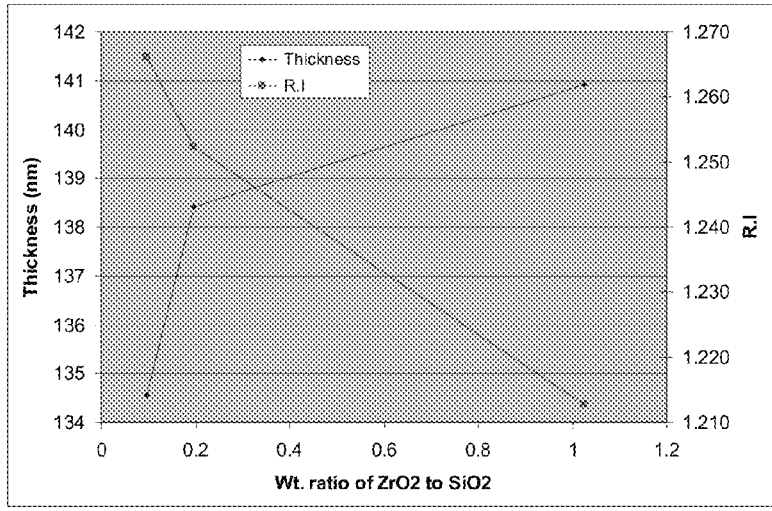

Figure 23. Thickness and refractive index of ACAR glass made by sol with silica and zirconium alkoxides. The labels in Figure are same as those in Table 17.

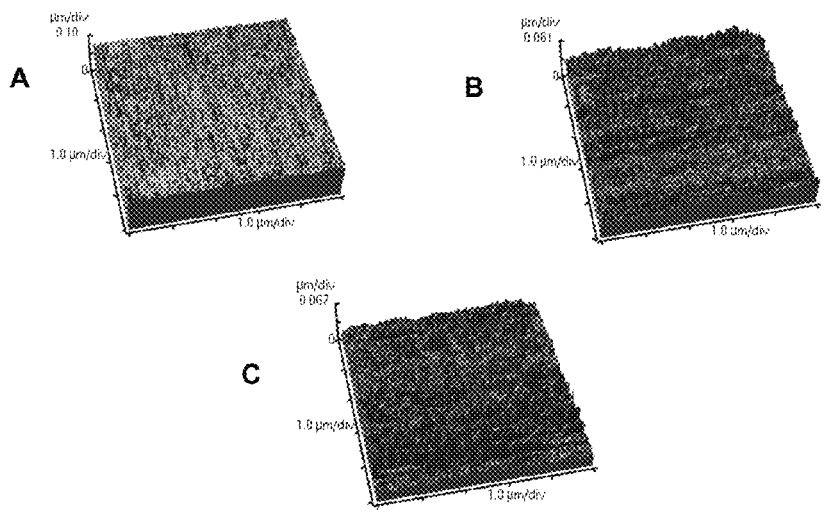

Figure 24. Morphology of ACAR glass measured by AFM. A: wt. ratio of $Al_2O_3$ to $SiO_2$ is 0.66 in sol with hybrid Al-Si alkoxide; B: wt. ratio of $B_2O_3$ to $SiO_2$ is 0.482 in sol with hybrid B-Si alkoxide; C: wt. ratio of $ZrO_2$ to $SiO_2$ is 1.024 in sol with hybrid Zr-Si alkoxide.

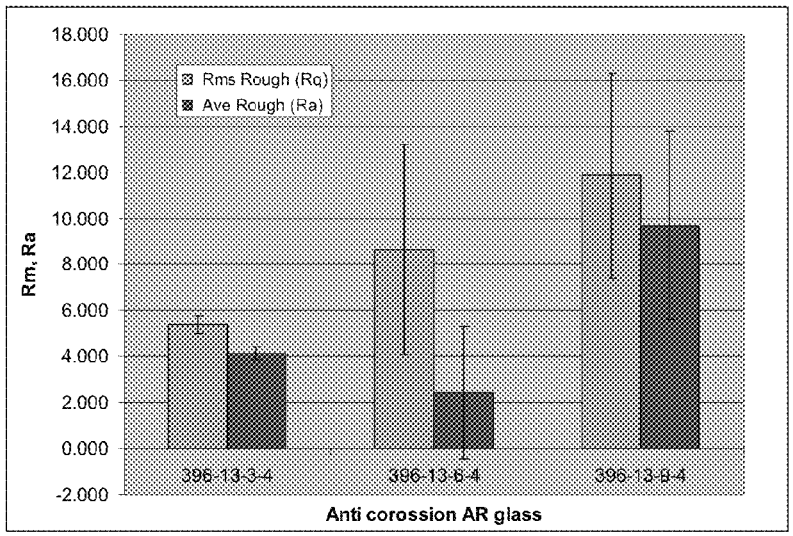
Figure 25. Arithmetic average roughness, $R_a$, and root mean square roughness, $R_m$ of ACAR glass. The labels in Figure are same as those in Table 18.
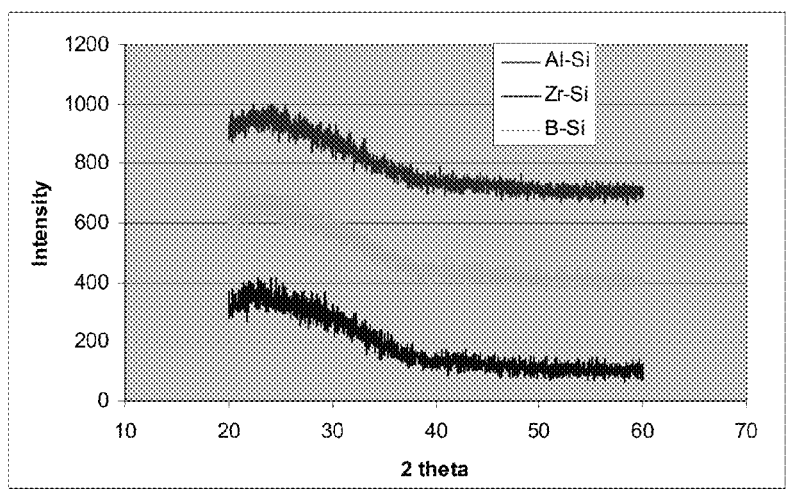
Figure 26. XRD patterns of ACAR glasses.

ANTI-CORROSION ANTI-REFLECTION GLASS AND RELATED METHODS

Certain example embodiments of this invention relate to substrates supporting anti-corrosion anti-reflection (ACAR) coatings, and/or methods of making the same. In certain example embodiments of this invention, such coatings may be used in photovoltaic devices, antifog mirrors, anti-glare applications, anti-UV applications, anti-smudge applications, anti-static applications, self-cleaning applications, electrochromic glass, storefront windows, display cases, picture frames, greenhouses, other types of windows, and/or in any other suitable application.

BACKGROUND AND SUMMARY OF EXAMPLE EMBODIMENTS OF THE INVENTION

Anti-reflection (AR) coatings are known in the art. SFO (solar float) and MM (matte-matte) glass, for example, have been coated using sol-gel processes to provide anti-reflective optics. However, SFO and MM glass developed using known sol-gel processes could be improved by providing better resistance to salt fogs and/or other forms of moisture that could corrode the coatings and cause them to degrade in anti-reflective performance and/or create undesirable visible appearances.

A salt fog test chamber may include steam vapor of NaOH and NaCl with a chamber temperature of 35° C. and pressure of 16 psi. Inability to sufficiently resist corrosion in salt fog environments simulated using a salt fog test chamber such as this may limit the application of anti-reflection (AR) glass used in some environments such as, for example, environments near oceans, with high mineral moisture, etc. For instance, a thin AR film can be easily removed after a salt fog test, e.g., after being structurally attacked in a manner that damages the adhesive strength between thin film and glass or other substrate that supports the coating.

It also is believed that alkali ions are preferentially leached from multiple components silica glasses with alkali oxides. The failure mechanism noted above thus could be attributed to the unsymmetrical glass, e.g., resulting from the attacks of sodium ions ($Na^+$) migrating from the glass bulk to the surface of the AR thin film. Some $Na^+$ ions in a salt fog solution could also provide a source to attack the AR thin film.

During salt fog testing processes, $Na^+$ ions from the glass substrate may diffuse into the AR coating layer, and consequently the properties of AR thin film may be changed. In some instances, there may be a layer of reduced sodium concentration and increased hydrogen amount near the glass-solution interface. When alkali ions are leached from the glass, it may provide a space that can allow water molecules to penetrate into the coating.

A hydrated layer could then be generated, especially in less durable glass. A more open structure in the hydrated layer of or on the glass surface may result in a faster transfer of ions from the glass, and a swell structure may also be found on a hydrated layer. Furthermore, hydroxyl groups produced by ion exchange between $Na^+$ and $H_2O$ may boost the hydrolysis of the siloxane bond and result in fatigue-type damage to the AR thin film.

Thus, it will be appreciated that there may be instances where it would be desirable to improve the chemical stability of AR thin films in potentially corrosive environments, e.g., as simulated by a salt fog chamber.

It is believed that, prior to the present disclosure, there was no reason to expect that the inclusion of hybrid alkoxides in an AR coating would lead to good durability for that coating. In fact, those skilled in the art might expect that AR coatings that include hybrid alkoxides would not be very strong and thus would not provide good durability.

This expectation stems from the belief that one might expect potential failure locations to be present at discontinuities in the coating, and the inclusion of hybrid alkoxides logically would involve a higher than usual number of potential failure locations, e.g., because of the structure of the alkoxides themselves as exacerbated by the hybrid materials included in the coating.

Yet despite these preexisting expectations, the present application relates to the inclusion of hybrid alkoxides in the AR coating of certain example embodiments, which surprisingly and unexpectedly leads to improved durability of the coating. More particularly, it is believed that the specific bonding energies of the materials may promote a sort of "self-healing" coating in ways that would not have been expected and that are surprising and unexpected.

In certain example embodiments, there is provided a method of making a coated article comprising an anti-reflection coating supported by a glass substrate. The method includes depositing on the glass substrate at least a portion of a solution comprising at least one hybrid alkoxide selected from the group consisting of $Si(OR)_4$—$Al(s-OBu)_3$, $Si(OR)_4$—$B(OBu)_3$ and $Si(OR)_4$ and $Zr(OBu)_4$, where R is a $CH_2CH_3$ group, s-OBu is sec-butoxide and OBu is n-butoxide, respectively, optionally with a silicon nanoparticle and a siloxane, to form a substantially uniform coating. The solution is cured and/or allowed to cure, in making the anti-reflection coating.

In certain example embodiments, there is provided a coated article comprising an anti-reflection coating supported by a glass substrate. The anti-reflection coating comprises a reaction product of a hydrolysis and/or a condensation reaction of at least one hybrid alkoxide selected from the group consisting of $Si(OR)_4$—$Al(s-OBu)_3$, $Si(OR)_4$—$B(OBu)_3$ and $Si(OR)_4$ and $Zr(OBu)_4$, where R is a $CH_2CH_3$ group, s-OBu is sec-butoxide and OBu is n-butoxide. The anti-reflection coating has a refractive index less than 1.5.

BRIEF DESCRIPTION OF THE DRAWINGS

These and other features and advantages may be better and more completely understood by reference to the following detailed description of exemplary illustrative embodiments in conjunction with the drawings, of which:

FIG. 1 schematically illustrates hydrolysis of $B(OBu)_3$.
FIG. 2 schematically illustrates hydrolysis of $Al(s-OBu)_3$.
FIG. 3 schematically illustrates hydrolysis of $Zr(OBu)_4$.
FIG. 4 schematically illustrates a hydrolysis of TEOS with acid as a catalyst.
FIG. 5 schematically illustrates condensation of hydrolyzed $B(OBu)_3$.
FIG. 6 schematically illustrates condensation of hydrolyzed $Al(s-OBu)_3$.
FIG. 7 schematically illustrates condensation of hydrolyzed $Zr(OBu)_4$.
FIG. 8 schematically illustrates a condensation of hydrolyzed $Si(OR)_4$ with acid as a catalyst.
FIG. 9 schematically illustrates hydrolysis of glass with an unsymmetrical network.
FIG. 10 schematically illustrates a durable structure of ACAR glass made by hybrid alkoxides with $Si(OR)_4$—$Al(s-OBu)_3$.
FIG. 11 schematically illustrates a chemical structure from hybrid alkoxides.

FIG. 12 schematically illustrates a GC-MS spectrum of Gen 1.5 sol.

FIG. 13 schematically illustrates a GC-MS spectrum of sol with Al(s-OBu)$_3$.

FIG. 14 schematically illustrates a GC-MS spectrum of sol from hybrid alkoxides with Si(OR)$_4$—Al(s-OBu)$_3$.

FIG. 15 schematically illustrates transmittance curves of ACAR glass made by a blended sol with different hybrid alkoxides, with the labels being the same as those provided in Table 8.

FIG. 16 schematically illustrates reflection curves of ACAR glass, with the labels being those provided in Table 9.

FIG. 17 schematically illustrates transmittance curves of ACAR glass made by mixed sols, with the labels being the same as those provided in Table 10.

FIG. 18 schematically illustrates transmittance curves of ACAR glass made by Al—Si hybrid alkoxides, with the labels being the same as those provided in Table 13.

FIG. 19 schematically illustrates transmittance curves of ACAR glass made by B—Si hybrid alkoxides, with the labels being the same as those provided in Table 13.

FIG. 20 schematically illustrates transmittance curves of ACAR glass made by Zr—Si hybrid alkoxides, with the labels being the same as those provided in Table 13.

FIG. 21 schematically illustrates the thickness and refractive index of ACAR glass made by a sol with silica and aluminum alkoxides, with the labels being the same as those provided in Table 17.

FIG. 22 schematically illustrates the thickness and refractive index of ACAR glass made by a sol with silica and boron alkoxides, with the labels being the same as those provided in Table 17.

FIG. 23 schematically illustrates the thickness and refractive index of ACAR glass made by a sol with silica and zirconium alkoxides, with the labels being the same as those provided in Table 17.

FIG. 24 schematically illustrates morphologies of ACAR glass measured by AFM. A: wt. ratio of $Al_2O_3$ to $SiO_2$ is 0.66 in sol with hybrid Al—Si alkoxide; B: wt. ratio of $B_2O_3$ to $SiO_2$ is 0.482 in sol with hybrid B—Si alkoxide; C: wt. ratio of $ZrO_2$ to $SiO_2$ is 1.024 in sol with hybrid Zr—Si alkoxide.

FIG. 25 schematically illustrates arithmetic average roughness, Ra, and root mean square roughness, Rm of ACAR glass, with the labels being the same as those provided in Table 18.

FIG. 26 schematically illustrates XRD patterns of ACAR glasses.

DETAILED DESCRIPTION OF EXAMPLE EMBODIMENTS OF THE INVENTION

Many oxides of multivalent cations may impart some resistance to alkaline attack, such as oxides of zirconium, aluminum, beryllium, lanthanum and transition metal, such as iron, manganese, and chromium. For instance, the likelihood of phase separation may be reduced by the addition of $Al_2O_3$ in borosilicate glass, by which the mechanical and chemical stability of glass are improved. A strategy to improve durability of AR glass is to develop AR glass in connection with hybrid alkoxides, by which the structure of AR thin film can be modified by oxides with higher bond energy and stable network configurations.

Anti-corrosion and anti-reflection (ACAR) glass with high stability in a salt fog chamber test may be prepared using hybrid alkoxides, such as Si(OR)$_4$—Al(s-OBu)$_3$, Si(OR)$_4$—B(OBu)$_3$ and Si(OR)$_4$ and Zr(OBu)$_4$, where R is $CH_2CH_3$ group, s-OBu is sec-butoxide and OBu is n-butoxide, respectively. The ACAR glass may be prepared by providing a sol with blended or mixed alkoxides, respectively. The performances of developed AR glass are evaluated by salt fog and copper accelerated acetic acid salt spray (CASS) testing. Compared with AR glass made by a sol with only silica alkoxide, greater durability existed in the ACAR glass made from hybrid alkoxides. Higher transmittance and lower reflection is also found with the developed ACAR glass. The morphologies of ACAR glasses are investigated by atomic force morphology (AFM), the optical performance of ACAR glass is studied using an Ellipsometer, and the mechanical stability of the ACAR thin film is examined using a crockmeter and a tape pull test.

Anti corrosion and reflection (ACAR) glasses with high durability are prepared by a sol gel process. A series of hybrid alkoxides, Si(OR)$_4$—Al(s-OBu)$_3$, Si(OR)$_4$—B(OBu)$_3$ and Si(OR)$_4$ and Zr(OBu)$_4$ are used as binders of the sol, where R is $CH_2CH_3$, s-OBu is sec-butoxide and OBu is n-butoxide. Two kinds of sols are prepared to make ACAR glass; one is from blended sol with hybrid alkoxides, and another is from a mixed sol with hybrid alkoxides. A study indicated that higher transmittance can be observed by AR glass developed from a blended sol.

Meanwhile, ACAR glass made by blended sol demonstrates an improved durability, e.g., as determined using a salt fog chamber test. The developed ACAR glass can pass at least 61 days of salt fog chamber testing. The durability of the ACAR thin film may be attributed to the enhancement of bond dissociation energy and the restoration function from the network of hybrid alkoxides. The changes of optical thickness and refractive index of ACAR glasses made by different hybrid alkoxides are investigated by Ellipsometer measurement. Both thickness and refractive index of ACAR glass are similar with those developed by Si(OR)$_4$—nanoparticles. A rough surface is observed by AFM analysis and the measurement of water contact angle. Mechanical and adhesive strength of ACAR thin films are evaluated by a crockmeter and a tape pull tests. Durability of the ACAR glasses are further examined by water boil, NaOH solution, damp heat chamber, and copper accelerated acetic acid salt spray (CASS) chamber testing. Excellent optical performance of ACAR glass, along with improved durability, allows the developed ACAR glass be used in some harsh environments, such as high concentration of salt environment, and it can be also expected that the life time of ACAR glass used in solar panel applications would be extended.

In an aspect, the formulation may contain a weight ratio of $Al_2O_3$ to $SiO_2$ of 0.01 to 1.0, of 0.05 to 0.7, or of 0.1 to 0.5. The formulation may contain a weight ratio of $B_2O_3$ to $SiO_2$ of 0.01 to 1.0, of 0.05 to 0.7, or of 0.1 to 0.5. The formulation may contain a weight ratio of $ZrO_2$ to $SiO_2$ of 0.01 to 1.5, of 0.01 to 1.0, of 0.05 to 0.7, or of 0.1 to 0.5. The inventors envision that all weight ratios within those ranges may also be suitable in some instances.

In certain exemplary embodiments, the firing may occur in an oven at a temperature ranging preferably from 550 to 700° C. (and all sub-ranges therebetween), more preferably from 575 to 675° C. (and all sub-ranges therebetween), and even more preferably from 600 to 650° C. (and all sub-ranges therebetween). The firing may occur for a suitable length of time, such as between 1 and 10 minutes (and all sub-ranges therebetween) or between 3 and 7 minutes (and all sub-ranges therebetween).

In addition, the composition of the atmosphere's gas may be controlled during curing; that is, the curing may occur, for example, in an inert atmosphere of nitrogen and/or argon, or in an atmosphere or other suitable gas. Furthermore, partial curing is contemplated and included within the term "curing" and its variants.

Although the spin-coating method may be used for applying the sol to a substrate, the uncured coating may be deposited in any suitable manner, including, for example, roll-coating, spray-coating, flow-coating, dip-coating, curtain-coating, slot die coating, meniscus coating, and any other method of depositing the uncured coating on a substrate.

Similarly, any suitable heat-resistant substrate (such as any type of glass) may be used in certain example embodiments.

EXPERIMENTAL

Materials

Tetraethyl orthosilicate (TEOS, Aldrich), N-propyl alcohol (NPA, Aldrich), acetic acid (AcOH, Fischer), elongated silica nanoparticles (IPA-ST-UP, 15% in iso-propanol, Nissan), aluminum s-butoxide, (Al(s-OBu)$_3$, Gelest), boron n-butoxide (B(OBu)$_3$, Gelest) and zirconium n-butoxide (Zr(OBu)$_4$, Gelest) are used without purification. Deionized water with conductivity as 18 Ω/cm is used in the experiments described herein. Solar float glass (SFO, thickness of 3.2 mm) is received from Phoenicia (Guardian). SFO glass has a tin side and an air side, which can be recognized with short wavelength UV light (e.g., at 256 nm) Unless otherwise noted, the coated side was the tin side.

Preparation of Sols with Metal Alkoxide

Table 1 lists the formulations of sols with different metal alkoxides. A typical procedure to make a sol from metal alkoxides is as follows: 6 g of metal alkoxide such as Al(s-OBu)$_3$ is added into 100 g of glass bottle, then 25 g of NPA and 2 g of HNO$_3$ is added to this bottle. The sols are stirred at room temperature for 72 hours before use.

TABLE 1

Sols from metal alkoxides

| Chem. | wt., g | M.W. | Mole | Mole ratio | wt. % |
|---|---|---|---|---|---|
| Al(s-OBu)$_3$ | | | | | |
| Al(s-OBu)$_3$ | 6 | 246.32 | 0.024 | 1.015 | 18.182 |
| HNO3 (70%) 15M | 2 | 63 | 0.022 | 0.926 | 6.061 |
| NPA | 25 | 60.1 | 0.416 | 17.332 | 75.758 |
| B(OBu)$_3$ | | | | | |
| B(OBu)$_3$ | 6 | 230.16 | 0.026 | 1.003 | 18.182 |
| HNO$_3$ (70%) 15M | 2 | 63 | 0.022 | 0.855 | 6.061 |
| NPA | 25 | 60.1 | 0.416 | 15.999 | 75.758 |
| Zr(OBu)$_4$ | | | | | |
| Zr(OBu)$_4$ | 6 | 383.68 | 0.016 | 1 | 18.182 |
| HNO$_3$ (70%) 15M | 2 | 63 | 0.022 | 1.421 | 6.061 |
| NPA | 25 | 60.1 | 0.416 | 26.6 | 75.758 |

Preparation of Sols Used for Making ACAR Glass by a Blended Approach

AR glass can be developed by blending sols with metal alkoxides and sols with silicon nanoparticles and siloxane. The formulation of a sol with silicon nanoparticles and siloxane used in this study is listed in Table 2 and is sometimes referred to herein as the Gen 1.5 Sol.

TABLE 2

Sol with silicon nanoparticle and siloxane

| Chem. | M.W. (g/mol) | Wt., g | Mol |
|---|---|---|---|
| NPA | 60.100 | 69.704 | 1.160 |
| Deionized water | 18.000 | 1.808 | 0.100 |
| Acetic acid (AcOH) | 60.050 | 4.889 | 0.081 |
| Tetraethyl orthosilicate (TEOS) | 208.330 | 3.636 | 0.017 |
| Nano silica particle (IPA-ST-UP) | 60.000 | 19.948 | 0.332 |

15% of elongated nano-particle in IPA-ST-UP
IPA-ST-UP: 9-15 nm of diameter and 100-140 nm of length
4 wt. % of SiO$_2$ A typical procedure to prepare sols with silicon nanoparticles and siloxane is as follows: 67.47 g of NPA is added to 200 ml of glass bottle with magnetic stirrer bar. To this solution, 3.636 of TEOS, 19.948 g of IPA-UP-ST and 1.808 g of Deionized water subsequently is added. Then, 4.889 g of AcOH is added to solution and the sol is stirred immediately at room temperature for 24 hours. The sol with a solid percentage of 3 wt. % is prepared by diluting with NPA.

The silica nanoparticles include about 15 wt. % amorphous silica, 85 wt. % isopropanol and less than about 1 wt. % water. If elongated silica particles are used, they can range in diameter between 9-15 nm with an average length of 40-100 nm and with the OH group present in an amount of about 5-8 OH/nm$^2$. Water-based silica nanoparticles, such as SNOW-TEX from Nissan Chemical, can also be used, with the size of silica nanoparticles ranging from 10-100 nm at a weight percentage of 20-40%.

In addition to elongated silica nanoparticles, spherical silica nanoparticles, such as those produced under the trade name ORGANOSILICASO (available from Nissan Chemical), having a particle size of between 9-15/40-100 nm, a wt. % SiO$_2$ of 15-16%, less than 1% water, a viscosity of less than 20 mPa·s and a specific gravity of between 0.85 and 0.90, can be used. The weight percentage of spherical silica nanoparticles in solution may range from 20-40%, which corresponds to 60-80% of solvent in the silica solution. Minor amounts of water in the range from 0.3 to 3 wt. % may also be present in the final solution.

For Gen 1.5 sols such as those in Table 2, the amount of solid SiO$_2$ may be about 4 wt. %. But the solid percentage can be from 0.6-10 wt. %, with the amount of solvent comprising 70-97 wt. %. The amount of tetraethyl orthosilicate (TEOS) used as a binder ranges from 0.3 to 20 mol %; the amount of acetic acid (which serves as a catalyst) may range from 0.01-7 mol %; and the molar ratio of water to silica ranges from 1.1 to 50.

Although acetic acid is mentioned, other acids or bases could be used in different examples. For instance, the catalyst could be an inorganic acid, an organic acid, or an inorganic base. Inorganic acids may include, for example, hydrochloric acid, nitric acid, phosphoric acid, sulphuric acid, boric acid, hydrofluoric acid, hydrobromic acid, perchloric acid, etc. Organic acids may include, for example, lactic acid, formic acid, citric acid, oxalic acid, uric acid, etc. Inorganic bases may include, for example, ammonium carbonate, ammonium hydroxide, barium hydroxide, cesium hydroxide, magnesium hydroxide, potassium hydroxide, rubidium hydroxide, sodium hydroxide, etc.

A typical solvent used in the silica solution may include alcohol, such as isopropanol, methanol, n-propanol, and ethanol. Other solvents may include N,N-dimethyl acetamide, ethylene glycol, ethylene glycol mono-n-propyl ether, methyl ethyl ketone, ethylene oxide, formamide, dimethylformamide, acetonitrile, dioxane, tetrahydrofuran, 2-ethoxyethanol, 2,2',2"-nitrilotriethanol, and methyl isobutyl ketone. Isopropanol is the recommended solvent for silica nanoparticles ranging in size from 10 to 100 nm.

A blended sol is prepared by blending the sols with metal alkoxides listed in Table 1, with sols with silicon nanoparticles and siloxane listed in Table 2. Table 3 lists formulations of blended sol made by different metal alkoxides and silicon nanoparticles. A typical procedure is as follows: 0.05 g of sol with metal alkoxides is added in to a 25 ml glass bottle. To this bottle, 9.95 g of sol with silicon nanoparticles is added. The sol is stirred at room temperature for 24 hours before use.

TABLE 3

Blend sols from hybrid alkoxides $Al(s-OBu)_3-Si(OR)_4$

| $Al(s-OBu)_3$ sol, g | Gen 1.5 sol, 3%, g | Total, g | $Al_2O_3$, g | $SiO_2$, g | $Al_2O_3/SiO_2$, wt. ratio |
|---|---|---|---|---|---|
| 0.050 | 9.950 | 10.000 | 0.019 | 0.299 | 0.063 |
| 0.100 | 9.900 | 10.000 | 0.038 | 0.297 | 0.127 |
| 0.500 | 9.500 | 10.000 | 0.188 | 0.285 | 0.660 |

$B(OBu)_3-Si(OR)_4$

| $B(OBu)_3$ sol, g | Gen 1.5, 3%, g | Total, g | $B_2O_3$, g | $SiO_2$, g | $B_2O_3/SiO_2$, wt. ratio |
|---|---|---|---|---|---|
| 0.050 | 9.950 | 10.000 | 0.014 | 0.299 | 0.046 |
| 0.100 | 9.900 | 10.000 | 0.027 | 0.297 | 0.093 |
| 0.500 | 9.500 | 10.000 | 0.137 | 0.285 | 0.482 |

$Zr(OBu)_4-Si(OR)_4$

| $Zr(OBu)_4$ sol, g | Gen 1.5, 3%, g | Total, g | $ZrO_2$, g | $SiO_2$, g | $ZrO_2/SiO_2$, wt. ratio |
|---|---|---|---|---|---|
| 0.050 | 9.950 | 10.000 | 0.029 | 0.299 | 0.098 |
| 0.100 | 9.900 | 10.000 | 0.058 | 0.297 | 0.197 |
| 0.500 | 9.500 | 10.000 | 0.292 | 0.285 | 1.024 |

ACAR Glass Made by Mixed Sols

Another approach of making ACAR glass is to use the mixed sol with hybrid alkoxides and silica particles. Tables 4, 5, and 6 list formulations of mixed sols from different hybrid alkoxides. A typical procedure of making sols is as follows: 17.5 g of NPA is added in 100 ml of glass bottle. To this bottle, 0.864 g of TEOS, 4.738 g of IPA-ST-UP and 0.227 g of $Al(s-OBu)_3$ sol is added subsequently. The sol is stirred for 24 hours at room temperature before adding 0.429 g of water, 1.161 g of acetic acid, and 0.076 g of $HNO_3$. Finally, the sol is stirred at room temperature for 24 hours and aged at room temperature for another four days.

TABLE 4

Mixed sols with hybrid alkoxides of $Al(s-OBu)_3-Si(OR)_4$

| Chem. g | $Al(s-OBu)_3-Si(OR)_4$ | | |
|---|---|---|---|
| NPA | 17.502 | 17.250 | 15.252 |
| Deionized water | 0.429 | 0.429 | 0.429 |
| Acetic acid (AcOH) | 1.161 | 1.161 | 1.161 |
| $HNO_3$ (70%) | 0.076 | 0.076 | 0.076 |
| Tetraethyl orthosilicate (TEOS) | 0.864 | 0.864 | 0.864 |
| Nano silica particle (IPA-ST-UP)* | 4.738 | 4.738 | 4.738 |
| Al(OBu)3 | 0.227 | 0.450 | 2.273 |
| Total | 24.997 | 24.997 | 24.793 |
| $Al(s-OBu)_3$, wt. % | 0.909 | 1.800 | 9.167 |
| $Al_2O_3$, g | 0.047 | 0.093 | 0.470 |
| $SiO_2$, g | 0.959 | 0.959 | 0.959 |
| $Al_2O_3/SiO_2$ wt. ratio | 0.049 | 0.097 | 0.490 |

*15% of elongated silica nanoparticles

TABLE 5

Mixed sol with hybrid alkoxides of $B(OBu)_3-Si(OR)_4$

| Chem. g | $B(OBu)_3-Si(OR)_4$ | | |
|---|---|---|---|
| NPA | 17.502 | 17.250 | 15.252 |
| Deionized water | 0.429 | 0.429 | 0.429 |
| Acetic acid (AcOH) | 1.161 | 1.161 | 1.161 |
| $HNO_3$ (70%) | 0.076 | 0.076 | 0.076 |
| Tetraethyl orthosilicate (TEOS) | 0.864 | 0.864 | 0.864 |
| Nano silica particle (IPA-ST-UP)* | 4.738 | 4.738 | 4.738 |
| B(OBu) | 0.227 | 0.450 | 2.273 |
| Total | 24.997 | 24.997 | 24.793 |
| B(OBu)3, wt. % | 0.909 | 1.800 | 9.167 |
| $B_2O_3$, g | 0.034 | 0.068 | 0.344 |
| $SiO_2$, g | 0.959 | 0.959 | 0.959 |
| $B_2O_3/SiO_2$ wt. ratio | 0.036 | 0.071 | 0.358 |

*15% of elongated silica nanoparticles

TABLE 6

Mixed sol with hybrid alkoxides of $Zr(OBu)_4-Si(OR)_4$

| Chem. g | $Zr(OBu)_4-Si(OR)_4$ | | |
|---|---|---|---|
| NPA | 17.502 | 17.250 | 15.252 |
| Deionized water | 0.429 | 0.429 | 0.429 |
| Acetic acid (AcOH) | 1.161 | 1.161 | 1.161 |
| $HNO_3$ (70%) | 0.076 | 0.076 | 0.076 |
| Tetraethyl orthosilicate (TEOS) | 0.864 | 0.864 | 0.864 |
| Nano silica particle (IPA-ST-UP)* | 4.738 | 4.738 | 4.738 |
| $Zr(OBu)_4$ | 0.227 | 0.450 | 2.273 |
| Total | 24.997 | 24.997 | 24.793 |
| $Zr(OBu)_4$, wt. % | 0.909 | 1.800 | 9.167 |
| $ZrO_2$, g | 0.292 | 0.578 | 2.944 |

TABLE 6-continued

Mixed sol with hybrid alkoxides of Zr(OBu)$_4$—Si(OR)$_4$

| Chem. g | | Zr(OBu)$_4$—Si(OR)$_4$ | |
|---|---|---|---|
| SiO$_2$, g | 0.959 | 0.959 | 0.959 |
| ZrO$_2$/SiO$_2$ wt. ratio | 0.304 | 0.603 | 3.068 |

*15% of elongated silica nanoparticles

Preparation of ACAR Glass

SFO glass (3"×3") with a thickness of 3.2 mm is washed by soap, rinsed with Deionized water, and dried with N$_2$ gas, respectively. Various sols are coated on surface of SFO glass using a spin coater. A typical spin coating speed is 1300 rpm, and a typical ramp is 255 rps. 2 ml of sol is transferred to the tin side of SFO glass mounted in a sample stage of the spin coater. The spin coating time is 30 sec. After spin coating, the back side of the coated glass is cleaned with tissue paper soaked with IPA. Then, the coated glass is heated in one box furnace at 650° C. for 3.5 min. A solid coated layer with a light blue color can be observed before heating, which indicates that partial condensation is occurred during spin coating. A stronger thin film is developed after heating, indicating that more condensation is carried out in heating process.

Characterization

Transmittance of ACAR Glass

Transmittance of ACAR glass is evaluated by considering the change of Tqe % of raw glass and ACAR glass. Tqe % is measured by UV-Vis spectroscopy (PE-1050, PerkinElmer) from 400 to 1200 nm, and average Tqe % is calculated using following equation:

$$Tqe\ \% = \frac{\sum_{i=400}^{1200} (Tqe\ \%)_i}{\sum_{i=400}^{1200} N_i} \quad (1)$$

The transmission gain ΔTqe % is calculated by subtracting Tqe % of raw glass from Tqe % of ACAR glass in the case of developed ACAR glass as shown in Eq. (2); and subtracting the pre Tqe % of ACAR glass from the post Tqe % of ACAR glass in the case of durability test as shown in Eq. (3).

$$\Delta Tqe\ \%_{|OpticalACAR} = (Tqe\ \%)_{ACAR} - (Tqe\ \%)_{raw} \quad (2)$$

$$\Delta Tqe\ \%_{|DurabilityACAR} = (Tqe\ \%)_{psotACAR} - (Tqe\ \%)_{preACAR} \quad (3)$$

Reflection of AR Glass

Broadband reflection of ACAR glass (400-1200 nm) is measured by UV-Vis spectroscopy meter (PE-1050, PerkinElmer). The average total reflection, R % is calculated using Eq. (4):

$$R\ \% = \frac{\sum_{i=400}^{1200} \rho_h(\lambda_i, \theta, h) E_\lambda(\lambda_i) \Delta\lambda_i}{\sum_{i=400}^{1200} E_\lambda(\lambda_i) \Delta\lambda_i} \quad (4)$$

where $\rho_h(\lambda, \theta, h)$ is the hemispherical reflection spectrum; $E_\lambda(\lambda_i)$ is the direct solar irradiance spectrum, and $\Delta\lambda$ is the wavelength interval. The wavelength interval used herein is 5 nm, although other wavelength intervals could have been used.

The reflection gain, ΔR % is calculated by subtracting R % of raw glass from R % of ACAR glass in the case of developed ACAR glass as shown in Eq. (5);

$$\Delta R\ \%_{|OpticaACAR} = (R\ \%)_{coatedACAR} - (R\ \%)_{raw} \quad (5)$$

Water Contact Angle

A contact angle instrument (FTA 135) is used to measure water contact angle of ACAR glass at room temperature. One sessile drop of Deionized water (~2.3 μl) is wetted on the surface of glass and the water contact angle is immediately measured. The data is the average values tested from three points on glass surface. The calculation of contact angle is performed by software (FTA, version 1.966).

Atomic Force Morphology (AFM)

The topography of ACAR glass is investigated by atomic force microscope (AFM, AP-0100, Parker Sci. Instrument). The non-contact method, preferred for soft surfaces in general, is used. The size of sample is about 1 cm×1 cm and the scanning area is 5 μm×5 μm. The scanning rate is 0.5. The surface roughness is quantitatively characterized by measuring the arithmetic average roughness, $R_a$, and root mean square roughness, $R_m$. The definition of $R_a$ and $R_m$ is described in following equations.

$$R_a = \frac{1}{n} \sum_{i=1}^{n} |y_i| \quad (6)$$

$$R_m = \sqrt{\frac{1}{n} \sum_{i=1}^{n} y_i^2} \quad (7)$$

where $y_i$ is the height of peak in AFM image.

XRD Analysis

The surface phase structure of ACAR glass is analyzed by X-ray diffraction (XRD, D8 advance, Bruker axs, CuKα). The scan rate is 1.2 degree/min. and scan range is from 20 degrees to 65 degrees.

Ellipsometer

Optical thickness and refractive index of ACAR glass were measured using an ellipsometer (J. A. Woollam Co., HS-190). The refractive index of ACAR glass was reported at a wavelength of 550 nm. The complex reflectance ratio ρ of a thin film is a function of the ellipsometric factors of ψ and Δ. The fundamental equation of ellipsometry is described as follows:

$$\rho = \tan \psi e^{i\Delta} = f(n_1, n_2, n, \phi, d, \lambda, k) \quad (8)$$

where $n_1$, $n_2$ and n represent the refractive index of the air, substrate, and film, respectively. Φ and λ represent the incident angle and wavelength of incident light, respectively. D and k are the thickness and extinction coefficient of the thin film. The optical constants and thickness of the glass substrate and thin film coating layer are kept constant in the examples described herein (although this need not always be the case). The relationship of ψ-λ, and Δ-λ are fitted under incident angle of 75 degree after adjusting n, d, and k. Fitting the optical constants of thin films with a Cauchy dispersion model can be described as follows:

$$n(\lambda) = A + \frac{B}{\lambda^2} + \frac{C}{\lambda^4} + \ldots \quad (9)$$

Eq. (9) coordinates ellipsometric parameters to allow for the determination of both thickness and optical constants for most transparent thin films. The mean square error (MSE) is a destination function that can be used to evaluate the quality of the match between measured and model calculated data. The MSE can be described as follows:

$$MSE = \frac{1}{2N - M} \sum_{i=1}^{N} \left[ \left( \frac{\psi_i^{mod} - \psi_i^{exp}}{\sigma_{\psi,i}^{exp}} \right)^2 + \left( \frac{\Delta_i^{mod} - \Delta_i^{exp}}{\sigma_{\Delta,i}^{exp}} \right)^2 \right] \quad (10)$$

where $\Delta$ and $\psi$ are the ellipsometric factors, the superscript "mod" refers to the calculated data, and the superscript "exp" refers to the experimental data. N is the number of ($\psi$, $\Delta$). M is the number of variable parameters. $\Sigma$ is the standard mean square deviation.

Gas Chromatography—Mass Spectrometry (GC-MS)

The chemical species and concentration of sols are analyzed by GC-MS (Agilent G1701DA). The column temperature is 340° C., and the heating ramp is 15° C./min. The carried gas of GC-MS analysis is Helium. The volume of the sample is 0.2 μl and the liquid sample is injected using a glass syringe. The chemical structure of the unknown fragment is identified by the data stored in MS library.

Durability Tests

Water Boil

The water boil test involves the following testing procedure. ACAR glass is immersed in one beaker filled with Deionized water at 100° C. After 10 min, the ACAR glass is removed from the boiling water and dried using $N_2$ gas before UV-vis measurement. The change of Tqe % will be calculated as the difference of Tqe % before and after water boil test. The water boil test is failed when ΔTqe % is larger than −0.5%.

NaOH Solution (0.1N)

The NaOH test involves the following testing procedure. ACAR glass is immersed in NaOH solution (0.1 N) filled in one beaker at room temperature. After 1 hour, the glass is taken from solution, rinsed using Deionized water and dried using $N_2$ gas. The change of Tqe % will be calculated as the difference of Tqe % before and after NaOH test. The water boil test is failed when ΔTqe % is larger than −0.5%.

Tape Pull

The tape pull test involves the following testing procedure. The tape (3179C, 3M) is adhered on the surface of the ACAR glass by pressing the tape with one's finger. After 1.5 minutes, the tape is pulled off quickly by hand and the residual adhesive of the tape will be removed with tissue paper (AccuWipe) soaked in NPA. The change of Tqe % will be calculated as the difference of Tqe % before and after tape pull test. The tape pull test is failed when ΔTqe % is larger than 1.5%.

Crockmeter

The crockmeter test involves a SDL Atlas CM-5 crockmeter. The size of the glass is 3"×3" and the total test cycle number is 750. The crockmeter test fails when ΔTqe % is larger than 1.5%.

Salt Fog Test

ACAR glasses are set in a salt fog chamber. The testing solution is made by mixing 0.013 g of NaOH and 186 g of NaCl. The pH of testing solution is in the range from 6.5 to 7.2. The testing solution is circulated using one pump and sprayed inside chamber. The chamber temperature is 35° C. and the pressure is 16 psi. The condensation of the testing solution on ACAR glass surface can enhance the damage of ACAR thin film. The Tqe % gain of ACAR glass is evaluated after a certain time. The glass is washed using tissue paper soaked with IPA before measurement of UV-Vis. The salt fog test is considered failed when ΔTqe % is larger than 2.0% after 4 days of testing.

Copper Accelerated Acetic Acid Salt Spray (CASS) Testing

The solution used in CASS test consists of 0.94 g of $CuCl_2$, 4.6 g of acetic acid and 258 g of NaCl. The chamber temperature is 49° C. and the pressure is 18 psi. The pH of solution is from 3.1 to 3.3. The change of Tqe % gain of ACAR glass is evaluated using UV-Vis measurement and the glass is washed using tissue paper soaked with IPA before measurement. The CASS test is failed when ΔTqe % is larger than 2.0% after 4 days of testing.

Damp Heat Test

A chamber at 85° C. and 85% relative humidity is used to evaluate the stability of the ACAR thin film. ACAR glasses are set in a sample holder for 10 days. The change of transmittance of ACAR glasses is evaluated using UV-Vis measurement. The glass is washed using tissue paper soaked with IPA before measurement. The damp heat test is failed when ΔTqe % is larger than 1.5% after 10 days of testing.

Results and Discussion

Solution Chemistry of Alkoxide-Inclusive Precursors

Hydrolysis and condensation are basic chemical reactions in alkoxides. Hydrolysis produces functional groups that can be further condensed. During the condensation, three dimensional cross-linked networks are generated. Normally, the hydrolysis of silica alkoxide, such as $Si(OR)_4$ is much slower than that of $Al(s-OBu)_3$, $B(OBu)_3$ and $Zr(OBu)_4$ since partial charge of the metal in silica alkoxide is lower.

Hydrolysis

Hydrolysis of Boron Alkoxide

In $B(OBu)_3$, boron is trigonal coplanar with $sp^2$ hybridization, by which an empty 2pz orbital is accessible to other electrons and makes boron have a very electrophilic character. Water molecules with enriched negative charged-on oxygen atom can attack trigonal boron, and hydrolysis is carried out according to an $SN_2$ mechanism. An intermediate is generated as shown in FIG. 1 and hydrolyzed $B(OBu)_3$ is formed with leaving of ROH.

Hydrolysis of $Al(s-OBu)_3$

Similar to the hydrolysis mechanism of $B(OBu)_3$, $Al(s-OBu)_3$ undergoes $SN_2$ hydrolysis. Hydrolyzed $Al(s-OBu)_3$ is generated after the leaving of ROH from the intermediate as shown in FIG. 2.

Hydrolysis of $Zr(OBu)_4$

Unlike most other metal alkoxides, zirconium undergoes hydrolysis based on the mechanism of de-alcoholation. First, one proton attacks the oxygen atoms of the alkoxides, by which hydrolyzed $Zr(OBu)_4$ is generated, leaving of $CH_2CH_2CH_2CH_3$. In the following step, this new hydroxo ligand separates from the complex together with another alkoxy group, thereby allowing the creation of the first Zr=O double bond. Those two first steps are repeated for the last two OR groups of the initial alkoxide so that the final product, $ZrO_2$, is a pure oxide as shown in FIG. 3.

Hydrolysis of $Si(OR)_4$

FIG. 4 shows the hydrolysis of TEOS with an acid as the catalyst. $SN_2$ mechanisms can be used to describe the hydrolysis of TEOS. First, the electrophilicity of the Si atom is enhanced by the attack of a proton on the OR group of TEOS. This proton is released from acetic acid. Now, the Si atom with more electrophilicity is easily attacked by the water molecule, and one intermediate is generated as shown in FIG. 4. The further reaction of the intermediate produces the hydrolyzed TEOS and releases a proton, $H^+$, which can be used again as the catalyst. This is a reversible process, and it can be repeated to generate various hydrolyzed TEOS molecules such as, for example, silicic acid $Si(OH)_4$, as fully hydrolyzed TEOS. The literature suggests that apart from the reversible hydrolysis of TEOS, an esterification also exists in the process.

Condensation

Condensation of Hydrolyzed B(OBu)$_3$

FIG. 5 shows the process of condensation of hydrolyzed B(OBu)$_3$. Apart from the trigonal state of boron, there is tetrahedral state of boron in solution. When boron is in a tetrahedral state, boron exists as neither a 2p nor a low d orbital available, as would be necessary for eventual sp$^3$d hybridization. It is quite stable and prevails in solution. Initial products could be dimer, trimer, and tetramer after condensation, as shown in FIG. 5. Further condensation will result in a cross-linked network.

Condensation of Hydrolyzed Al(s-OBu)$_3$

FIG. 6 shows the condensation of hydrolyzed Al(s-OBu)$_3$. When aluminum alkoxides condense, a double oxygen bridge forms between two aluminum atoms. A series of oligomers could be generated during the condensation. The extent of oligomerization of aluminum alkoxides depends mainly on the steric bulk of the alkoxides ligand.

Condensation of Hydrolyzed Zr(OBu)$_4$

FIG. 7 shows the condensation of hydrolyzed Zr(OBu)$_4$. Similar to the mechanism of SN$_2$, the zirconium atom is more electrophilic after a proton attack on one hydroxyl group. With the attacking of the hydroxyl group on another hydrolyzed Zr(OBu)$_4$, one bonded O—Zr—O chain is generated, as shown in FIG. 7.

Condensation of Si(OR)$_4$

The hydrolyzed Si(OR)$_4$ can be further condensed by route of water and alcohol condensation, as shown in FIG. 8. The reversible reaction is hydrolysis and alcoholysis. First, a proton will attack the oxygen atom in a hydroxyl group of hydrolyzed alkoxysilane, which increases the electrophilicity of the Si atom, and it is now easily attacked by the hydroxyl group from the hydrolyzed alkoxysilane molecule. One water molecule is released from the intermediate and H$_3$$^+$O is generated from water and a proton.

Mechanisms of ACAR Glass Made Using Hybrid Alkoxides

Hydrolysis of AR Thin Film without Hybrid Aalkoxides

The hydrolysis mechanism of the AR thin film can be described by FIG. 9. There are many oxygen-bridge ions existing in normal soda-lime-silica based glass with no long-range order, although a short range order is sometimes possible. The introduction of some alkaline oxides, such as Na$_2$O can hydrolyze silica-oxygen bonds to form non oxygen bridge ions, e.g., as shown in FIG. 9. The extra electronic charge of non oxygen bridge ions is neutralized by alkaline ions. The presence of non oxygen ions may damage the substantially integral and symmetrical glass structure, which can degrade properties of glass such as, for example, chemical stability and mechanical strength. The presence of non oxygen ions also enables the electron density to be withdrawn from silicon. As a result, silicon is more electrophilic and thus more susceptible to attack from water. Minor hydroxyl groups in a salt fog solution and Na$^+$ ions migrating from the glass bulk to the AR thin film also can attack the silicon atoms, e.g., by a SN$_2$—Si mechanism, in which OH-displaces OR— with inversion of the silicon tetrahedron. The attack by the hydroxyl group may be affected by both steric and inductive factors, and one five-coordinate intermediate is generated. The intermediate decays through broken bonds of siloxanes, by which the glass is damaged by the hydrolyzed siloxane, again as shown in FIG. 9.

Repair Mechanism of ACAR Glass Made by Hybrid Alkoxides

FIG. 10 shows the mechanism of ACAR glass made by hybrid alkoxides of Al$_2$O$_3$ and SiO$_2$. Al$^{3+}$ can exist in silica materials with two different coordinates, namely, octahedral and tetrahedral. In soda-lime glass, Al$^{3+}$ generally is in a tetrahedral structure when the ratio of Al$_2$O$_3$ to Na$_2$O is less than one. Al$^{3+}$ can catch one non oxygen bridge ion to generate an Al$^{4+}$ tetrahedral structure, which connects with Si—O tetrahedral structures and repairs the broken network. Uniform or substantially uniform three dimensional networks can enhance integrity and symmetry of the glass matrixes, which consequently increases the chemical stability of glass.

Increasing of Bond Dissociation Energy of ACAR Thin Film

The chemical structure of ACAR glass made by hybrid alkoxides can be schematically illustrated, e.g., as shown in FIG. 11. By introducing a non-silica element such as B, Al, and/or Zr, the chemical durability of the final AR thin film can be effectively improved. This is because partial bonding from Si—O—X (X: B, Al, and/or Zr) in the network of Si—O—Si enhances the bond dissociation energy of network. The bond dissociation energies of different oxides are summarized in Table 7. It is clear that the bond dissociation energies of B—O, Al—O, and Zr—O are higher than that of Si—O.

TABLE 7

| Bond dissociation energy of different oxides | | |
|---|---|---|
| Bond | Oxide | Bond energy (KJ/mol) |
| Si—O | SiO$_2$ | 315 |
| B—O | B$_2$O$_3$ | 774 |
| Al—O | Al$_2$O$_3$ | 484 |
| Zr—O | ZrO$_2$ | 753 |

Example Results

GC-MS Spectra of Sols

FIGS. 12, 13, and 14 show the GC-MS spectra of partial sols used in this study. As shown in FIG. 12, the peaks of water, ethylanol, iso-propanol, n-propanol, and n-propyl acetate are found in GC spectrum of Gen 1.5 sol, which is one sol with TEOS and silica nanoparticles. The ethylanol is a byproduct of the hydrolysis of TEOS. Similarly, n-propyl acetate is the reactant of acetic acid and n-propanol at high temperature. There is no peak of TEOS, which suggests that almost all TEOS is hydrolyzed after certain aging time.

FIG. 13 shows the GC-MS spectrum of a sol with Al(s-OBu)$_3$. In addition to peaks of NPA as a major ingredient in sol, other chemical compounds, such as 1-propene-2-methyl, propanol, and 2-butanol, are found. 2-butanol and propanol could be fragments of s-OBu, and 1-propene-2-methyl could be rearrangement of some fragments.

FIG. 14 shows the GC-MS spectrum of a sol with hybrid alkoxides from Si(OR)$_4$—Al(s-OBu)$_3$. The peaks that appeared in FIGS. 12 and 13 can be found in FIG. 14, as well. Meanwhile, new peaks attributed to acetic acid, 1-methyl-ester and n-propyl acetate could be the condensation reactants of acetic acid and different alcohols.

Tqe % Gain of ACAR Glass

Table 8 lists the transmittance and Tqe % gain of ACAR glass made using a blended sol with different hybrid alkoxides. FIG. 15 shows the transmittance curves with changing wavelengths. For comparison purposes, the data of AR glass made with the Gen 1.5 sol is provided in Table 8 and FIG. 15.

It is clear that ACAR glasses demonstrate higher transmittance than anti-reflection glass. Tqe % gain is in the range from 3.03% to 3.22%, depending on the composition and kind of alkoxides. It is also clear that Tqe % gain of ACAR glass is close to that of AR glass developed by Gen 1.5 sol. In certain example embodiments, the Tqe % gain is at least 2.5%, more preferably at least 3.0%, and still more preferably at least 3.2%.

TABLE 8

Transmittance and Tqe % gain of ACAR glass

| ID | Glass | Sol | Wt. ratio of metal oxide to $SiO_2$ | Peak (nm) | Tqe % raw | Tqe % ACAR | Tqe % gain |
|---|---|---|---|---|---|---|---|
| GEN 1.5 3% | SFO—Sn | Si | — | 705 | 90.822 | 94.069 | 3.247 |
| 396-13-1 | SFO—Sn | Al—Si | 0.063 | 695 | 90.822 | 94.014 | 3.193 |
| 396-13-2 | SFO—Sn | Al—Si | 0.127 | 610 | 90.822 | 94.016 | 3.195 |
| 396-13-3 | SFO—Sn | Al—Si | 0.660 | 580 | 90.822 | 93.841 | 3.020 |
| 396-13-4 | SFO—Sn | B—Si | 0.046 | 610 | 90.822 | 94.055 | 3.233 |
| 396-13-5 | SFO—Sn | B—Si | 0.093 | 610 | 90.822 | 94.054 | 3.232 |
| 396-13-6 | SFO—Sn | B—Si | 0.482 | 565 | 90.822 | 94.006 | 3.184 |
| 396-13-7 | SFO—Sn | Zr—Si | 0.098 | 610 | 90.822 | 94.024 | 3.202 |
| 396-13-8 | SFO—Sn | Zr—Si | 0.197 | 645 | 90.822 | 94.043 | 3.221 |
| 396-13-9 | SFO—Sn | Zr—Si | 1.024 | 505 | 90.822 | 93.928 | 3.107 |

Reflection of ACAR Glass

In order to confirm the optical performance of ACAR glass, the reflection of ACAR glass is measured. The data are summarized in Table 9. It is clear that the reflection values of ACAR glass is close to that of AR glass made using the Gen 1.5 sol. FIG. 16 shows the reflection curve of ACAR glass with a broadband range from 400 to 1200 nm. The reflection of ACAR glass is almost half of that from raw SFO glass, e.g., as shown in Table 9 and FIG. 16.

TABLE 9

Reflection of ACAR glass

| ID | Glass | Sol | wt. ratio of metal oxide to $SiO_2$ | R % raw glass | R % ACAR | R % gain |
|---|---|---|---|---|---|---|
| SFO-REF | SFO/Sn | — | — | 8.318 | 8.318 | 0.000 |
| 396-34-1 GEN1.5 | SFO/Sn | Si | — | 8.318 | 4.995 | −3.323 |
| 396-34-4 | SFO/Sn | Al—Si | 0.063 | 8.318 | 5.073 | −3.244 |
| 396-34-6 | SFO/Sn | Al—Si | 0.127 | 8.318 | 5.021 | −3.297 |
| 396-34-8 | SFO/Sn | Al—Si | 0.660 | 8.318 | 5.067 | −3.251 |

Transmittance of ACAR Glass Made Using Mixed Sols

The transmittances of ACAR glasses made using mixed sols are evaluated, and the data are summarized in Table 10. It can be seen that a lower Tqe % gain is achieved with mixed sol, as compared with ACAR glass made using a blended sol. Faster hydrolysis of Al(s-OBu)$_3$, B(OBu)$_3$, and Zr(OBu)$_4$ may alter the structure of the ACAR thin film and porosity, which can affect the optical performance of ACAR glass. FIG. 17 shows the transmittance of ACAR glass made by mixed sols.

TABLE 10

Transmittance and Tqe % gain of ACAR glass made by mixed sols

| ID | Hybrid sol | wt. ratio | Peak (nm) | Tqe %, raw | Tqe % ACAR | Tqe % gain |
|---|---|---|---|---|---|---|
| 396-17-1 | Zr—Si | 0.304 | 570 | 90.822 | 93.034 | 2.212 |
| 396-17-2 | Zr—Si | 0.603 | 605 | 90.822 | 93.082 | 2.260 |

TABLE 10-continued

Transmittance and Tqe % gain of ACAR glass made by mixed sols

| ID | Hybrid sol | wt. ratio | Peak (nm) | Tqe %, raw | Tqe % ACAR | Tqe % gain |
|---|---|---|---|---|---|---|
| 396-17-3 | Zr—Si | 3.68 | 500 | 90.822 | 91.428 | 0.606 |
| 396-17-4 | Al—Si | 0.049 | 685 | 90.822 | 93.559 | 2.737 |
| 396-17-5 | Al—Si | 0.097 | 850 | 90.822 | 93.235 | 2.413 |
| 396-17-6 | Al—Si | 0.49 | 500 | 90.822 | 92.328 | 1.506 |
| 396-17-7 | B—Si | 0.036 | 595 | 90.822 | 93.396 | 2.574 |
| 396-17-8 | B—Si | 0.071 | 610 | 90.822 | 93.287 | 2.465 |
| 396-17-9 | B—Si | 0.358 | 500 | 90.822 | 91.062 | 0.240 |

Salt Fog Test of ACAR Glass Made Using Blended Sols

Table 11 lists the change of Tqe % gain with salt fog testing times. It was observed that one sample of AR glass made using the Gen 1.5 sol failed after 4 days of testing, but all AR glass made using the Gen 1.5 sol fail after 9 days of testing. However, all ACAR glasses made using hybrid alkoxides passed four days of salt fog tests. ACAR glasses made using sols less than 0.482, weight ratio of $B_2O_3$ to $SiO_2$ can pass fifteen days of test. It thus will be appreciated that a ratio of 0.75 or less, 0.6 or less, and more preferably 0.5 or less, is desirable when it comes to extending survival times, at least in some cases. ACAR glass made using a sol with hybrid silica and zirconium alkoxides can pass 15 days of test when weight ratio of $ZrO_2$ to $SiO_2$ is higher than 1.024. This ratio preferably is 0.8 or higher, more preferably 0.9 or higher, and still more preferably 1.0 or higher. ACAR glasses made from sols with silica and aluminum alkoxides passed 61 days of test. It was found that the ACAR glass thin film after 61 days of testing was still strongly adhered to the glass surface and, therefore, longer life time can be expected in some cases.

When the amount of boron is lower in an ACAR thin film, $B^{3+}$ can exist with the tetrahedral structure of [$BO_4$]. This is because $B^{3+}$ can catch one non oxygen bridge ion to generate $B^{4+}$ tetrahedral structure, which connects with a Si—O tetrahedral structure together and repairs broken networks, e.g., as shown in FIG. 10. The formation of the $B^{4+}$ tetrahedral structure plays a role in repairing broken bonds and improving the strength of the glass network. When more boron is used in ACAR thin film, $B^{3+}$ will be back to the octahedral structure, by which the durability of AR thin film will be decreased. It can be expected that the durability of an ACAR thin film will decrease when the amount of Al is increased. The durability increase of AR thin film made using a sol with $Zr(OBu)_4$ could be attributed to the bond dissociation energy of Zr—O. More Zr—O bonds in the ACAR thin film may improve chemical resistance.

TABLE 11

Salt Fog Test of ACAR Glass Made Using a Blended Sol

| ID | Sol | X/SiO$_2$, wt. ratio | Peak (nm) | Tqe % raw SFO | Tqe % AR pre | Tqe % gain | 4 days Tqe % AR | 4 days Tqe % gain | 9 days Tqe % AR | 9 days Tqe % gain |
|---|---|---|---|---|---|---|---|---|---|---|
| 396-34-1 | Gen 1.5 3% | — | 680 | 90.822 | 94.008 | 3.186 | 93.977 | −0.031 | 90.928 | −3.080 |
| 396-34-2 | Gen 1.5 3% | — | 610 | 90.822 | 94.041 | 3.219 | 94.047 | 0.005 | 90.922 | −3.119 |
| Gen 1.5 | Gen 1.5 3% | — | 705 | 90.822 | 94.069 | 3.247 | 91.055 | −3.013 | — | — |
| 396-13-1 | Si—Al | 0.063 | 695 | 90.822 | 94.014 | 3.192 | 93.952 | −0.063 | 93.940 | −0.074 |
| 396-13-2 | Si—Al | 0.127 | 615 | 90.822 | 94.016 | 3.194 | 93.987 | −0.030 | 93.969 | −0.047 |
| 396-13-3 | Si—Al | 0.66 | 595 | 90.822 | 93.841 | 3.019 | 93.862 | 0.020 | 93.909 | 0.068 |
| 396-13-4 | Si—B | 0.046 | 615 | 90.822 | 94.055 | 3.233 | 94.013 | −0.042 | 94.002 | −0.053 |
| 396-13-5 | Si—B | 0.093 | 610 | 90.822 | 94.054 | 3.232 | 94.053 | −0.001 | 94.009 | −0.045 |
| 396-13-6 | Si—B | 0.482 | 570 | 90.822 | 94.006 | 3.184 | 93.965 | −0.041 | 90.983 | −3.023 |
| 396-13-7 | Si—Zr | 0.098 | 685 | 90.822 | 94.024 | 3.202 | 94.025 | 0.001 | 91.443 | −2.581 |
| 396-13-8 | Si—Zr | 0.197 | 610 | 90.822 | 94.043 | 3.221 | 94.016 | −0.027 | 94.008 | −0.035 |
| 396-13-9 | Si—Zr | 1.024 | 685 | 90.822 | 93.928 | 3.106 | 94.004 | 0.076 | — | — |

| ID | Sol | X/SiO$_2$, wt. ratio | Peak (nm) | 15 days Tqe % AR | 15 days Tqe % gain | 20 days Tqe % AR | 20 days Tqe % gain | 36 days Tqe % AR | 36 days Tqe % gain | 61 days Tqe % AR | 61 days Tqe % gain |
|---|---|---|---|---|---|---|---|---|---|---|---|
| 396-34-1 | Gen 1.5 3% | — | 680 | — | — | — | — | — | — | — | — |
| 396-34-2 | Gen 1.5 3% | — | 610 | — | — | — | — | — | — | — | — |
| Gen 1.5 | Gen 1.5 3% | — | 705 | — | — | — | — | — | — | — | — |
| 396-13-1 | Si—Al | 0.063 | 695 | 93.968 | −0.046 | 93.990 | −0.024 | 90.869 | −3.146 | | |
| 396-13-2 | Si—Al | 0.127 | 615 | 93.938 | −0.078 | 93.921 | −0.095 | 93.519 | −0.497 | 93.947 | −0.069 |
| 396-13-3 | Si—Al | 0.66 | 595 | 93.902 | 0.061 | 93.963 | 0.121 | 93.953 | 0.111 | 94.052 | 0.211 |
| 396-13-4 | Si—B | 0.046 | 615 | 93.892 | −0.163 | 93.814 | −0.240 | 90.981 | −3.073 | — | — |
| 396-13-5 | Si—B | 0.093 | 610 | 93.372 | −0.682 | 92.463 | −1.591 | 90.961 | −3.093 | — | — |
| 396-13-6 | Si—B | 0.482 | 570 | 90.938 | −3.068 | — | — | — | — | — | — |
| 396-13-7 | Si—Zr | 0.098 | 685 | 91.355 | −3.165 | — | — | — | — | — | — |
| 396-13-8 | Si—Zr | 0.197 | 610 | 90.859 | −2.688 | — | — | — | — | — | — |
| 396-13-9 | Si—Zr | 1.024 | 685 | 93.964 | 0.035 | 93.864 | −0.065 | 91.100 | −2.828 | — | — |

Underline: fail
Bold: pass
X: Al, B, Zr

Salt Fog Test of ACAR Glass Made Using Mixed Sols

The durability of ACAR glass made using mixed sols is also evaluated by salt fog chamber testing, and the results are presented in Table 12. All ACAR glassed made using hybrid alkoxides from $Zr(OBu)_4$—$Si(OR)_4$ pass 4 days of testing, and it was found that there is an increase of Tqe % gain during salt fog testing. Most of the ACAR glass samples made using hybrid alkoxides from $B(OBu)_3$—$Si(OR)_4$ faired well after 4 days of salt fog test.

TABLE 12

Tqe % gain of ACAR glass made by mixed hybrid alkoxides during salt fog test

| ID | sol | Wt. ratio of metal oxide to SiO$_2$ | Tqe % pre | Tqe % post | Tqe % gain |
|---|---|---|---|---|---|
| 396-17-1 | Zr—Si | 0.304 | 93.034 | 93.747 | 0.713 |
| 396-17-2 | Zr—Si | 0.603 | 93.082 | 93.690 | 0.608 |
| 396-17-3 | Zr—Si | 3.68 | 91.428 | 91.686 | 0.258 |
| 396-17-4 | Al—Si | 0.049 | 93.559 | 93.640 | 0.081 |
| 396-17-5 | Al—Si | 0.097 | 93.235 | 93.352 | 0.117 |
| 396-17-6 | Al—Si | 0.49 | 92.328 | 92.111 | −0.217 |
| 396-17-7 | B—Si | 0.036 | 93.396 | 90.978 | −2.418 |
| 396-17-8 | B—Si | 0.071 | 93.287 | 90.970 | −2.317 |
| 396-17-9 | B—Si | 0.358 | 91.062 | 91.077 | 0.015 |

Repeatability Test

ACAR glasses from different hybrid alkoxides are prepared in order to check repeatability of the procedure. Table 13 shows the optical performance of ACAR glass prepared during repeatability testing. Tqe % gain above 3.0% with an error range from 0.043 to 0.14 is achieved for prepared ACAR glasses. FIGS. 18, 19, and 20 show the transmittance curves of ACAR glass made by different hybrid alkoxides. Typical transmittance curves of anti reflection glass can be observed with higher transmittance from 600 to 700 nm. Meanwhile, low transmittance can be seen in far infrared and near UV region.

additional durability tests. At 100° C., it is possible that the water dissolves molecularly into the glass and reacts with the silicon-oxygen lattice to generate —SiOH groups. This reaction can cause a dramatic change in the mechanical strength of thin film. It was reported during this molecular diffusion that the concentration of alkali in the bulk of the glass is unaffected, except by ion exchange just at the glass surface. The data shown in Table 14 indicates that the diffusion of water into glass is limited; therefore, the mechanical properties, especially the adhesive strength of thin film, was not affected.

TABLE 13

Optical performance of ACAR glass prepared in repeatability process

| ID | Sol | wt. ratio of metal oxide to SiO$_2$ | Peak pre (nm) | Tqe % raw | Tqe % ACAR | Tqe % gain | Ave. Tqe % gain | STD |
|---|---|---|---|---|---|---|---|---|
| 396-13-3-1 | Al—Si | 0.66 | 630 | 90.769 | 93.969 | 3.200 | 3.128 | 0.14098722 |
| 396-13-3-2 | Al—Si | 0.66 | 620 | 90.769 | 93.970 | 3.201 | | |
| 396-13-3-3 | Al—Si | 0.66 | 635 | 90.769 | 93.996 | 3.227 | | |
| 396-13-3-4 | Al—Si | 0.66 | 600 | 90.769 | 93.617 | 2.848 | | |
| 396-13-3-5 | Al—Si | 0.66 | 585 | 90.769 | 93.923 | 3.154 | | |
| 396-13-3-6 | Al—Si | 0.66 | 615 | 90.769 | 93.906 | 3.137 | | |
| 396-13-6-1 | B—Si | 0.482 | 560 | 90.769 | 93.797 | 3.028 | 3.094 | 0.05439952 |
| 396-13-6-2 | B—Si | 0.482 | 580 | 90.769 | 93.872 | 3.104 | | |
| 396-13-6-3 | B—Si | 0.482 | 580 | 90.769 | 93.919 | 3.151 | | |
| 396-13-6-4 | B—Si | 0.482 | 575 | 90.769 | 93.919 | 3.151 | | |
| 396-13-6-5 | B—Si | 0.482 | 565 | 90.769 | 93.869 | 3.100 | | |
| 396-13-6-6 | B—Si | 0.482 | 565 | 90.769 | 93.800 | 3.031 | | |
| 396-13-9-1 | Zr—Si | 1.024 | 600 | 90.769 | 93.931 | 3.163 | 3.130 | 0.04332733 |
| 396-13-9-2 | Zr—Si | 1.024 | 595 | 90.769 | 93.905 | 3.136 | | |
| 396-13-9-3 | Zr—Si | 1.024 | 565 | 90.769 | 93.815 | 3.047 | | |
| 396-13-9-4 | Zr—Si | 1.024 | 620 | 90.769 | 93.932 | 3.163 | | |
| 396-13-9-5 | Zr—Si | 1.024 | 580 | 90.769 | 93.915 | 3.146 | | |
| 396-13-9-6 | Zr—Si | 1.024 | 600 | 90.769 | 93.896 | 3.128 | | |

Adhesive and Mechanical Strength of ACAR Glass

The durability of ACAR glasses also is evaluated by water boil, NaOH solution (0.1N), tape pull, and crockmeter tests. Water boil and NaOH solution tests can be used to evaluate the chemical stability of ACAR glass. Tape pull and crockmeter tests can be used to judge the mechanical strength of the ACAR thin film. Table 14 lists the measurement results. It can be seen from Table 14 that all ACAR glasses passed these An increase of Tqe % gain of ACAR glass also was observed after water boil and NaOH solution tests. During water boil and NaOH solution tests, residual burn chemicals inside the ACAR thin film can be further removed and the porosity of thin film can be enlarged, which is beneficial to the improvement of the anti-reflection properties of the thin film. More decreases of Tqe % gain can be seen during the tape pull test for ACAR glass, which could be attributed to an attack from the solvent, IPA, during the cleaning process.

TABLE 14

Adhesive and mechanical strength of ACAR glass

| ID | Glass | Test | Sol | Wt. ratio of metal oxide to SiO$_2$ | Peak pre (nm) | Tqe % pre | Tqe % post | Tqe % gain |
|---|---|---|---|---|---|---|---|---|
| 396-13-3-1 | SFO/Sn | Crockmeter | Al—Si | 0.66 | 630 | 93.969 | 93.671 | −0.298 |
| 396-13-3-2 | SFO/Sn | Tape pull | Al—Si | 0.66 | 620 | 93.970 | 93.573 | −0.397 |
| 396-13-3-3 | SFO/Sn | Water boil | Al—Si | 0.66 | 635 | 93.996 | 94.107 | 0.111 |
| 396-13-3-4 | SFO/Sn | NaOH | Al—Si | 0.66 | 600 | 93.617 | 93.905 | 0.288 |
| 396-13-6-1 | SFO/Sn | Crockmeter | B—Si | 0.482 | 560 | 93.797 | 93.641 | −0.156 |
| 396-13-6-2 | SFO/Sn | Tape pull | B—Si | 0.482 | 580 | 93.872 | 93.266 | −0.607 |
| 396-13-6-3 | SFO/Sn | Water boil | B—Si | 0.482 | 580 | 93.919 | 94.053 | 0.134 |
| 396-13-6-4 | SFO/Sn | NaOH | B—Si | 0.482 | 575 | 93.919 | 94.093 | 0.173 |
| 396-13-9-1 | SFO/Sn | Crockmeter | Zr—Si | 1.024 | 600 | 93.931 | 93.751 | −0.180 |
| 396-13-9-2 | SFO/Sn | Tape pull | Zr—Si | 1.024 | 595 | 93.905 | 93.680 | −0.225 |
| 396-13-9-3 | SFO/Sn | Water boil | Zr—Si | 1.024 | 565 | 93.815 | 93.949 | 0.134 |
| 396-13-9-4 | SFO/Sn | NaOH | Zr—Si | 1.024 | 620 | 93.932 | 94.108 | 0.176 |

CASS Test of ACAR Glass

Table 15 lists CASS test results of ACAR glasses with a testing period of four days. All ACAR glass passed CASS testing, and the increased Tqe % gain in some AR glass after CASS testing is observed. The acidity environment presented in the CASS chamber may not pose a risk to the ACAR glass, as sodium hydroxyl (NaOH) formed during the migration of sodium ions from glass can be neutralized by acetic acid. Increased Tqe % gain may be attributed to washing of residual burn chemicals inside the thin film as observed in water boil and NaOH solution testing.

TABLE 15

Tqe % gain of ACAR glass during CASS test

| ID | Glass | Sol | Wt. ratio of metal oxide to SiO$_2$ | Peak pre (nm) | Tqe % pre | Tqe % post | Tqe % gain |
|---|---|---|---|---|---|---|---|
| 396-13-3-5 | SFO/Sn | Al—Si | 0.66 | 585 | 93.923 | 93.991 | 0.068 |
| 396-13-6-5 | SFO/Sn | B—Si | 0.482 | 565 | 93.869 | 93.980 | 0.111 |
| 396-13-9-5 | SFO/Sn | Zr—Si | 1.024 | 580 | 93.915 | 94.034 | 0.119 |

Damp Heat Test of ACAR Glass

The durability of ACAR glass is further evaluated by damp heat testing. High temperature and high humidity in the damp heat chamber can speed the damage of the AR thin film. However, table 16 shows that there is no significant decrease of Tqe % gain of ACAR glass with 10 days of damp heat test, which indicates stronger binding existed in the ACAR thin films.

TABLE 16

Tqe % gain change of ACAR glass during damp heat test

| ID | Glass | Sol | Wt. ratio of metal oxide to SiO$_2$ | Peak pre (nm) | Tqe % pre | Tqe % post | Tqe % gain |
|---|---|---|---|---|---|---|---|
| 396-13-3-6 | SFO/Sn | Al—Si | 0.66 | 615 | 93.906 | 93.819 | −0.087 |
| 396-13-6-6 | SFO/Sn | B—Si | 0.482 | 565 | 93.800 | 93.690 | −0.110 |
| 396-13-9-6 | SFO/Sn | Zr—Si | 1.024 | 600 | 93.896 | 93.581 | −0.316 |

Thickness and Refractive Index of ACAR Glass

The optical thickness and refractive index (R.I.) of ACAR glass is investigated using an Ellipsometer, and the data is summarized in Table 17. With the increase of Al(s-OBu)$_3$ or B(OBu)$_3$ amount in sols, the thickness of the ACAR thin film is decreased, but the refractive index shows an increasing trend. However, the increase of thickness and decrease of refractive index is observed for AR glass made using a sol with hybrid zirconium and silica alkoxides. The reverse changes of thickness and reflective index with composition might be ascribed to the different structures of the ACAR thin film. A more dense structure might be present in ACAR thin films made using Si—Al or Si—B hybrid alkoxies, as those thin films demonstrate higher refractive indexes with increases of Al and/or B amounts in the thin films. On the other hand, more porous structures might be observed in thin films made using Si—Zr hybrid alkoxides. FIGS. 21, 22, and 23 show the relationship among the composition, thickness, and refractive index of various ACAR glasses.

TABLE 17

Change of thickness and refractive index of ACAR glass with composition

| ID | Glass | Sol | Wt. ratio of metal oxide to SiO$_2$ | MSE | Thickness (nm) | R.I. |
|---|---|---|---|---|---|---|
| 396-13-1 | SFO/Sn | Al—Si | 0.063 | 0.754 | 145.157 | 1.257 |
| 396-13-2 | SFO/Sn | Al—Si | 0.127 | 0.687 | 132.92 | 1.253 |
| 396-13-3 | SFO/Sn | Al—Si | 0.66 | 0.323 | 125.037 | 1.290 |
| 396-13-4 | SFO/Sn | B—Si | 0.046 | 0.9199 | 138 | 1.260 |
| 396-13-5 | SFO/Sn | B—Si | 0.093 | 1.073 | 132.878 | 1.225 |
| 396-13-6 | SFO/Sn | B—Si | 0.482 | 1.302 | 121.456 | 1.277 |
| 396-13-7 | SFO/Sn | Zr—Si | 0.098 | 8.209 | 134.554 | 1.266 |
| 396-13-8 | SFO/Sn | Zr—Si | 0.197 | 0.377 | 138.409 | 1.252 |
| 396-13-9 | SFO/Sn | Zr—Si | 1.024 | 0.7227 | 140.914 | 1.213 |

Surface Morphology of ACAR Glass

FIG. 24 shows morphologies of ACAR glasses made by hybrid alkoxides. Table 18 and FIG. 25 present statistical data concerning surface roughness. It is clear that surface roughness increases with the order of ACAR glass made using Si—Al, B—Si, and Zr—Si.

TABLE 18

Arithmetic average roughness, $R_a$, and root mean square roughness, $R_m$, of ACAR glass

| ID | Glass/coated side | Sol | Wt. ratio of metal oxide to SiO$_2$ | Rm | STD | Ra | STD |
|---|---|---|---|---|---|---|---|
| 396-13-3-4 | SFO/Sn | Al—Si | 0.66 | 5.388 | 0.384 | 4.144 | 0.273 |
| 396-13-6-4 | SFO/Sn | B—Si | 0.482 | 8.624 | 4.576 | 2.426 | 2.887 |
| 396-13-9-4 | SFO/Sn | Zr—Si | 0.102 | 11.859 | 4.468 | 9.688 | 4.089 |

XRD Patterns of ACAR Glass

FIG. 26 shows XRD patterns of ACAR glass made using different hybrid alkoxides. There are no crystalline structures in the XRD patterns. The amorphous structure of the ACAR thin films can be attributed to the small amount of metal alkoxide and fast cooling rate of thin film after heating.

Water Contact Angle

Water contact angles of ACAR glass made using different hybrid alkoxides are listed in Table 19. There is almost the same water contact angle, namely around 5.5 degrees, with ACAR glass made using different hybrid alkoxides. A small amount of metal alkoxide in the ACAR thin film did not significantly change surface property.

TABLE 19

Water contact angle of ACAR glass

| ID | Glass/ coated side | Sol | Wt. ratio of metal oxide to SiO$_2$ | Contact angle, Ave. | STD |
|---|---|---|---|---|---|
| 396-13-3-4 | SFO/Sn | Al—Si | 0.66 | 5.35 | 1.70 |
| 396-13-6-4 | SFO/Sn | B—Si | 0.48 | 5.49 | 0.30 |
| 396-13-9-4 | SFO/Sn | Zr—Si | 1.02 | 5.98 | 1.20 |

As will be appreciated from the above, anti-corrosion and anti-reflection (ACAR) glass may be developed from sols made using hybrid alkoxides. The hybrid alkoxides may include Si(OR)$_4$—Al(s-OBu)$_3$, Si(OR)$_4$—B(OBu)$_3$ and Si(OR)$_4$ and Zr(OBu)$_4$, where R is CH$_2$CH$_3$ group, s-OBu is sec-butoxide and OBu is n-butoxide, respectively. Two kinds of sols are used to make AR glass; one is from blended sol with hybrid alkoxides, and another is from mixed sol with hybrid alkoxides. As shown above, higher transmittance and durable ACAR glass can be achieved by using a blended sol. ACAR glass made using blended sol shows Tqe % gains as high as 3.2%, and the data is almost same as those made from the Gen 1.5 sol. The reflection of ACAR glass made using the blended sol is almost half of raw SFO glass. The durability of ACAR glass is evaluated using a salt fog chamber test. ACAR glasses made using hybrid alkoxide from Si(OR)$_4$—Al(s-OBu)$_3$ present the best results and pass at least 61 days of testing. Failures of salt fog tests are observed for ACAR glass made using higher amount of B(OBu)$_3$ (>0.5 wt. %) and lower amount of Zr(OBu)$_4$ (<0.5 wt. %) in the sol. The durability increase of ACAR glass can be attributed to the structure rearrangement of Al$^{+3}$ or B$^{+3}$ ions from octahedral and tetrahedral configuration, by which the broken bonds produced by non oxygen bond can be repaired, and the strength of glass network be enhanced. Advantages of ACAR glass made using hybrid alkoxides from Si(OR)$_4$ and Zr(OBu)$_4$ can be attributed to to higher bond dissociation energy of Zr—O. Other chemical tests, including water boil, NaOH solution (0.1N), damp heat chamber, and CASS tests, further confirm excellent durability of developed ACAR glass. ACAR thin films passed crockmeter and tape pull test, which indicate that the mechanical strength of the ACAR thin films is accepted. The water contact angle of ACAR glasses is almost the same as that of AR glass made using the Gen 1.5 sol, which shows that minor amounts of metal alkoxide may have little to no effect on surface properties of the ACAR glass. The surface morphology of ACAR glasses shows a trend of roughness decreases with the following order of alkoxides: Zr(OBu)$_4$>B(OBu)$_3$>Al(s-OBu)$_3$. The amorphous structure of the ACAR thin film is found by XRD measurement. The optical thickness and refractive index of ACAR glass was related with the composition and, more particularly, with the metal alkoxide used in the ACAR thin film. More dense structures might be expected in ACAR glass made by higher amount of hybrid alkoxides from Si(OR)$_4$—Al(s-OBu)$_3$ and Si(OR)$_4$—B(OBu)$_3$.

In certain example embodiments, a method of making a coated article comprising an anti-reflection coating supported by a glass substrate is provided. At least a portion of a solution comprising at least one hybrid alkoxide selected from the group consisting of Si(OR)$_4$—Al(s-OBu)$_3$, Si(OR)$_4$—B(OBu)$_3$ and Si(OR)$_4$ and Zr(OBu)$_4$, where R is a CH$_2$CH$_3$ group, s-OBu is sec-butoxide and OBu is n-butoxide, respectively, is deposited, directly or indirectly, on the glass substrate. The deposited solution is cured and/or allowed to cure, in making the anti-reflection coating.

In addition to the features of the previous paragraph, in certain example embodiments, the solution may comprise Si(OR)$_4$—Al(s-OBu)$_3$, where R is a CH$_2$CH$_3$ group and s-OBu is sec-butoxide; Si(OR)$_4$—B(OBu)$_3$, where R is a CH$_2$CH$_3$ group and OBu is n-butoxide; Si(OR)$_4$, where R is a CH$_2$CH$_3$ group; and/or Zr(OBu)$_4$, where R is a CH$_2$CH$_3$ group and OBu is n-butoxide.

In addition to the features of either of the two previous paragraphs, in certain example embodiments, the solution may comprise a silicon nanoparticle and siloxanes, and/or tetraethyl orthosilicates.

In addition to the features of the previous paragraph, in certain example embodiments, the solution may comprise a weight ratio of Al$_2$O$_3$ to SiO$_2$ of 0.01 to 1.0; silica inclusive alkoxides and aluminum inclusive alkoxides; a weight ratio of B$_2$O$_3$ to SiO$_2$ of 0.01 to 1.0 (more preferably a weight ratio of B$_2$O$_3$ to SiO$_2$ of less than 0.5); and/or a weight ratio of ZrO$_2$ to SiO$_2$ of 0.01 to 1.5 (more preferably a weight ratio of ZrO$_2$ to SiO$_2$ of greater than 1.0).

In addition to the features of any of the four previous paragraphs, in certain example embodiments, the anti-reflection coating may have a refractive index less than 1.5.

In certain example embodiments, there is provided a coated article comprising an anti-reflection coating supported by a glass substrate. The anti-reflection coating comprises a reaction product of a hydrolysis and/or a condensation reaction of at least one hybrid alkoxide selected from the group consisting of Si(OR)$_4$—Al(s-OBu)$_3$, Si(OR)$_4$—B(OBu)$_3$ and $Si(OR)_4$ and $Zr(OBu)_4$, where R is a $CH_2CH_3$ group, s-OBu is sec-butoxide and OBu is n-butoxide. The anti-reflection coating has a refractive index less than 1.5.

In addition to the features of the previous paragraph, in certain example embodiments, the at least one hybrid alkoxide comprises $Si(OR)_4$—$Al(s-OBu)_3$, where R is a $CH_2CH_3$ group and s-OBu is sec-butoxide; the at least one hybrid alkoxide comprises comprises $Si(OR)_4$—$B(OBu)_3$, where R is a $CH_2CH_3$ group and OBu is n-butoxide; the at least one hybrid alkoxide comprises $Si(OR)_4$, where R is a $CH_2CH_3$ group; and/or the at least one hybrid alkoxide comprises $Zr(OBu)_4$, where R is a $CH_2CH_3$ group and OBu is n-butoxide.

In addition to the features of either of the two previous paragraphs, in certain example embodiments, the anti-reflection coating may provide a Tqe % gain of about 3.2%.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of making a coated article comprising an anti-reflection coating supported by a glass substrate, the method comprising:
    depositing, directly or indirectly, on the glass substrate at least a portion of a solution comprising at least one hybrid alkoxide comprising $Si(OR)_4$ and $Zr(OBu)_4$, where R is a $CH_2CH_3$ group, and OBu is n-butoxide, respectively;
    wherein the solution comprises a weight ratio of $ZrO_2$ to $SiO_2$ of greater than 1.0; and
    curing the deposited solution and/or allowing the deposited solution to cure, in making the anti-reflection coating.

2. The method according to claim 1, wherein the solution comprises a silicon nanoparticle and siloxanes.

3. The method according to claim 1, wherein the solution comprises tetraethyl orthosilicates.

4. The method according to claim 1, wherein the anti-reflection coating has a refractive index less than 1.5.

* * * * *